(12) United States Patent
Murakami et al.

(10) Patent No.: US 7,231,522 B2
(45) Date of Patent: Jun. 12, 2007

(54) INFORMATION PROCESSING APPARATUS, METHOD FOR CONTROLLING THE SAME, AND STORAGE MEDIUM

(75) Inventors: Tomochika Murakami, Kanagawa (JP); Keiichi Iwamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 09/969,778

(22) Filed: Oct. 4, 2001

(65) Prior Publication Data
US 2002/0059520 A1   May 16, 2002

(30) Foreign Application Priority Data
Oct. 12, 2000 (JP) ............................ 2000-312373
Sep. 18, 2001 (JP) ............................ 2001-283964

(51) Int. Cl.
*H04L 9/00* (2006.01)
(52) U.S. Cl. ...................................... 713/176; 358/3.28
(58) Field of Classification Search ................ 713/176; 382/128, 132; 358/3.28
See application file for complete search history.

(56) References Cited

U.S. PATENT DOCUMENTS

| | | | |
|---|---|---|---|
| 4,747,103 A | 5/1988 | Iwamura et al. ............... 371/37 |
| 5,259,891 A | 11/1993 | Matsuyama et al. ......... 136/244 |
| 5,279,679 A | 1/1994 | Murakami et al. ........... 136/246 |
| 5,313,530 A | 5/1994 | Iwamura ....................... 380/28 |
| 5,380,371 A | 1/1995 | Murakami ................... 136/256 |
| 5,694,330 A | 12/1997 | Iwamura et al. ............. 364/496 |
| 5,708,714 A | 1/1998 | López et al. .................... 380/25 |
| 5,943,037 A * | 8/1999 | Hosking et al. ............. 345/419 |
| 6,008,451 A | 12/1999 | Ichinose et al. ............. 136/256 |
| 6,215,492 B1 * | 4/2001 | Okuyama et al. ........... 715/839 |
| 2002/0003895 A1* | 1/2002 | Some ......................... 382/132 |

OTHER PUBLICATIONS

Intec (Ton Kalker, "Watermakr Estimation Through Detector Observations", http://www.intec.rug.ac.be/Research/Groups/hfhsdesign/viva/publications/bsps98.pdf).*
Bender et al. (W. Bender, D. Gruhl, N. Morimoto, A. Lu, "Techniques for data hiding").*
Berghel et al. (Hal Berghel and Lawrence O'Gorman, "Digital Watermarking", Jan. 1997).*
Microsoft, "Dompcuter Dicionary", 3rd edition, Microsoft Press, ISBN: 157231446X, 1997, p. 346.*

* cited by examiner

*Primary Examiner*—Kambiz Zand
*Assistant Examiner*—Peter Pottorak
(74) *Attorney, Agent, or Firm*—Fitzpatrick, Cella, Harper & Scinto

(57) ABSTRACT

An object of the present invention is to assuredly provide image data with the position of a region of interest in an image represented by the image data. In order to achieve this object, position information for specifying a region of interest within the image is embedded so as not to be recognized by human eyes, using a digital-watermark technique.

19 Claims, 19 Drawing Sheets

FIG.11
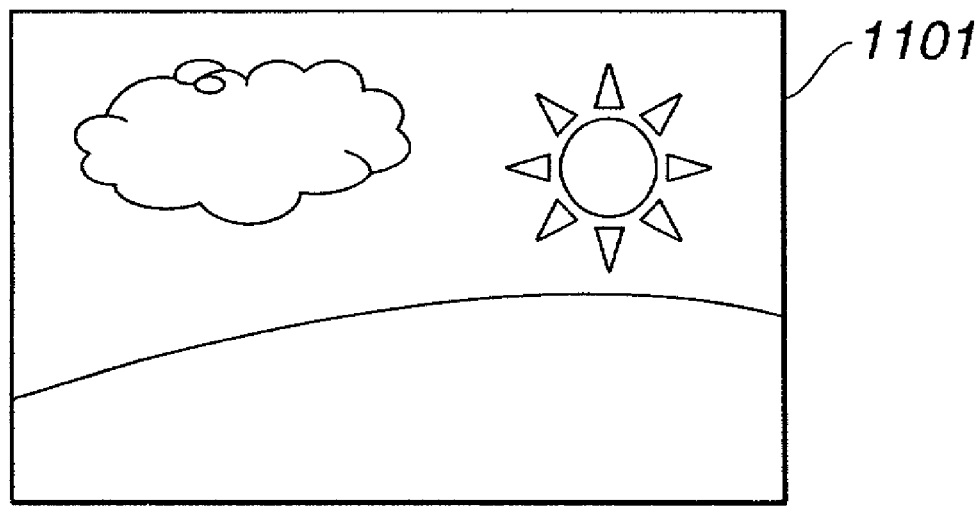
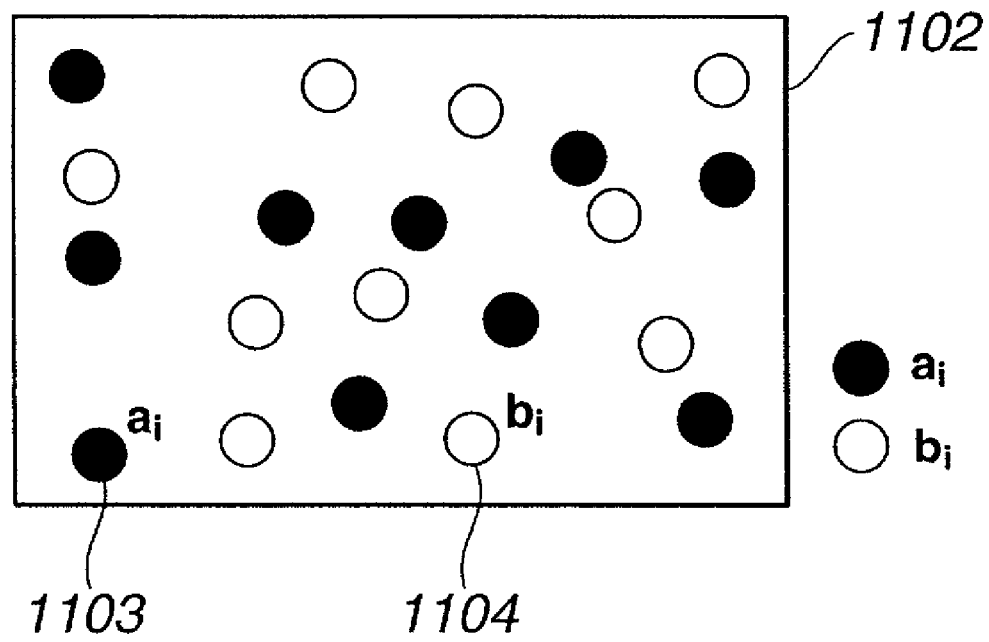

INFORMATION PROCESSING APPARATUS, METHOD FOR CONTROLLING THE SAME, AND STORAGE MEDIUM

BACKGROUND OF THE INVENTION

1. Field of the Invention

The present invention relates to an apparatus for embedding information in a digital image in the form of a digital watermark or the like and reproducing the embedded information, a method for controlling the apparatus, and a storage medium.

2. Description of the Related Art

Recently, in accordance with rapid development and diffusion of computers and computer networks, various types of information, such as character data, image data, sound data and the like, are digitized.

Digital information is not degraded, for example, with the lapse of time, can always be preserved in a complete state, can easily be copied using a computer, and can easily be distributed via a network. However, such convenient properties make it difficult to assure the security of digital information.

A digital watermark is one security technique of digital information. According to this technique, by embedding the name of the owner of a copyright, the ID of a vender and other similar identification information by processing digital image data, sound data, character data and the like so as not to be perceptible by a human being, illegal copying can be traced.

Accordingly, the digital watermark also has the features that main data and subdata embedded therein is difficult to separate, and therefore can always be recognized and used as single data.

Recently, in medical fields, management of patient information in which various sets of information are efficiently linked by digitizing medical records and diagnostic images and utilizing a computer is in progress. In such fields, there is a request to inseparably hold digital medical data, such as digital X-ray images and the like, and additional information thereof (such as patient/diagnosis information).

Providing digital medical data and additional information thereof (such as patient/diagnosis information) in an inseparable state has the following two advantages.

The first advantage is that it is unnecessary to separately manage the above-described two types of information. The second advantage is that by holding information for identifying a patient in a state of being inseparable from digital medical information, the digital medical information can be used as evidence.

Conventionally, after embedding subdata by slightly changing main data using the digital watermark technique, the subdata is detected/extracted from the main data after the change. At that time, it is difficult to restore the main data before the change.

It is unsuitable to apply the above-described conventional technique to actual medical fields in which, for example, main data is sometimes a diagnostic image of a patient, because examination of data changed from the original main data may result in an inaccurate diagnosis.

Accordingly, it is necessary at the time of diagnosis to restore digital medical data which is not degraded.

In medical fields, a clear indication of a region of interest in main data (image) is sometimes used as reference information at a diagnosis or reference information for other functions. This information indicating the region of interest desirably belongs to the main data (image). If such data is present as data separate from the main data, the information indicating the region of interest can be easily changed by anybody, whereby an appropriate diagnosis may not be performed.

SUMMARY OF THE INVENTION

The present invention has been made in consideration of the above-described problems.

It is an object of the present invention to provide a technique for assuredly providing image data with the position of a region of interest in an image represented by the image data.

It is another object of the present invention to provide a method for effectively using information relating to the above-described region.

It is still another object of the present invention to provide a digital-watermark technique adapted to a situation in which original digital data must be correctly restored, such as a case in which original digital data represents a medical image.

According to one aspect, the present invention which achieves these objectives relates to an information processing apparatus for inputting original digital image information and embedding additional information in the digital image information. The apparatus includes region assignment means for assigning a desired region in an image represented by the digital image information, and embedding means for embedding information indicating a position of the assigned region in the digital image information as the additional information. The presence of the additional information cannot be recognized by human eyes from an image visualized from the digital image information in which the additional information is embedded.

According to another aspect, the present invention which achieves these objectives relates to a method for controlling an information processing apparatus for inputting original digital image information and embedding additional information in the digital image information. The method includes a region assignment step of assigning a desired region in an image represented by the digital image information, and an embedding step of embedding information indicating a position of the assigned region in the digital image information as the additional information. The presence of the additional information cannot be recognized by human eyes from an image visualized from the digital image information in which the additional information is embedded.

According to still another aspect, the present invention which achieves these objectives relates to storage medium storing program codes operating as an information processing apparatus for inputting original digital image information and embedding additional information in the digital image information, by being read and executed by a computer. The program codes include a program code of a region assignment step of assigning a desired region in an image represented by the digital image information, and a program code of an embedding step of embedding information indicating a position of the assigned region in the digital image information as the additional information. The presence of the additional information cannot be recognized by human eyes from an image visualized from the digital image information in which the additional information is embedded.

According to yet another aspect, the present invention which achieves these objectives relates to an information processing apparatus for inputting original digital image information and embedding additional information in the digital image information. The apparatus includes display means for displaying an image represented by the digital image information, region assignment means for assigning a desired region in the displayed image, and embedding means for embedding information indicating a position of the assigned region in the digital image information as the additional information. The presence of the additional information cannot be recognized by human eyes from an image visualized from the digital image information in which the additional information is embedded.

According to yet a further aspect, the present invention which achieves these objectives relates to a method for controlling an information processing apparatus for inputting original digital image information and embedding additional information in the digital image information. The method includes a display step of displaying an image represented by the digital image information, a region assignment step of assigning a desired region in the displayed image, and an embedding step of embedding information indicating a position of the assigned region in the digital image information as the additional information. The presence of the additional information cannot be recognized by human eyes from an image visualized from the digital image information in which the additional information is embedded.

According to still another aspect, the present invention which achieves these objectives relates to a storage medium storing program codes operating as an information processing apparatus for inputting original digital image information and embedding additional information in the digital image information, by being read and executed by a computer. The program codes include a program code of a display step of displaying an image represented by the digital image information, a program code of a region assignment step of assigning a desired region in the displayed image, and a program code of an embedding step of embedding information indicating a position of the assigned region in the digital image information as the additional information. The presence of the additional information cannot be recognized by human eyes from an image visualized from the digital image information in which the additional information is embedded.

According to still another aspect, the present invention which achieves these objectives relates to an information processing apparatus for extracting additional information embedded in digital image information from the digital image information and outputting the extracted additional information. The apparatus includes extraction means for extracting the additional information embedded in the digital image information, and output means for making the information extracted by the extraction means position information, and outputting a corresponding position in the digital image information so to as to be identifiable, based on the position information. The presence of the additional information cannot be recognized by human eyes from an image visualized from the digital image information in which the additional information is embedded.

According to still another aspect, the present invention which achieves these objectives relates to a method for controlling an information processing apparatus for extracting additional information embedded in digital image information from the digital image information and outputting the extracted additional information. The method includes an extraction step of extracting the additional information embedded in the digital image information, and an output step of making the information extracted by the extraction means position information, and outputting a corresponding position in the digital image information so to as to be identifiable, based on the position information. The presence of the additional information cannot be recognized by human eyes from an image visualized from the digital image information in which the additional information is embedded.

According to still another aspect, the present invention which achieves these objectives relates to a storage medium storing program codes operating as an information processing apparatus for extracting additional information embedded in digital image information from the digital image information and outputting the extracted additional information, by being read and executed by a computer. The program codes include a program code of an extraction step of extracting the additional information embedded in the digital image information, and an program code of an output step of making the information extracted by the extraction means position information, and outputting a corresponding position in the digital image information so to as to be identifiable, based on the position information. The presence of the additional information cannot be recognized by human eyes from an image visualized from the digital image information in which the additional information is embedded.

It is yet another object of the present invention to embed digital-watermark information indicating a position of a region of interest in the region of interest, and determine reliability of a position estimated/specified as the region of interest by comparing the digital-watermark information extracted from the region of interest with a position in image data where a digital watermark has been extracted.

According to still another aspect, the present invention which achieves the above-described object relates to an information processing apparatus further including assumption means for assuming a position where the additional information is embedded, in an image represented by the digital image information, and determination means for determining reliability of a result of the assumption by comparing a position represented by the position information extracted by the extraction means with the assumed position.

The foregoing and other objects, advantages and features of the present invention will become more apparent from the following description of the preferred embodiments taken in conjunction with the accompanying drawings.

BRIEF DESCRIPTION OF THE DRAWINGS

FIG. 11 includes diagrams illustrating the principle of a patchwork method;

DESCRIPTION OF THE PREFERRED EMBODIMENTS

Preferred embodiments of the present invention will now be sequentially described.

First Embodiment

First, the entire configuration of a first embodiment of the present invention will be described.

Figure 1:
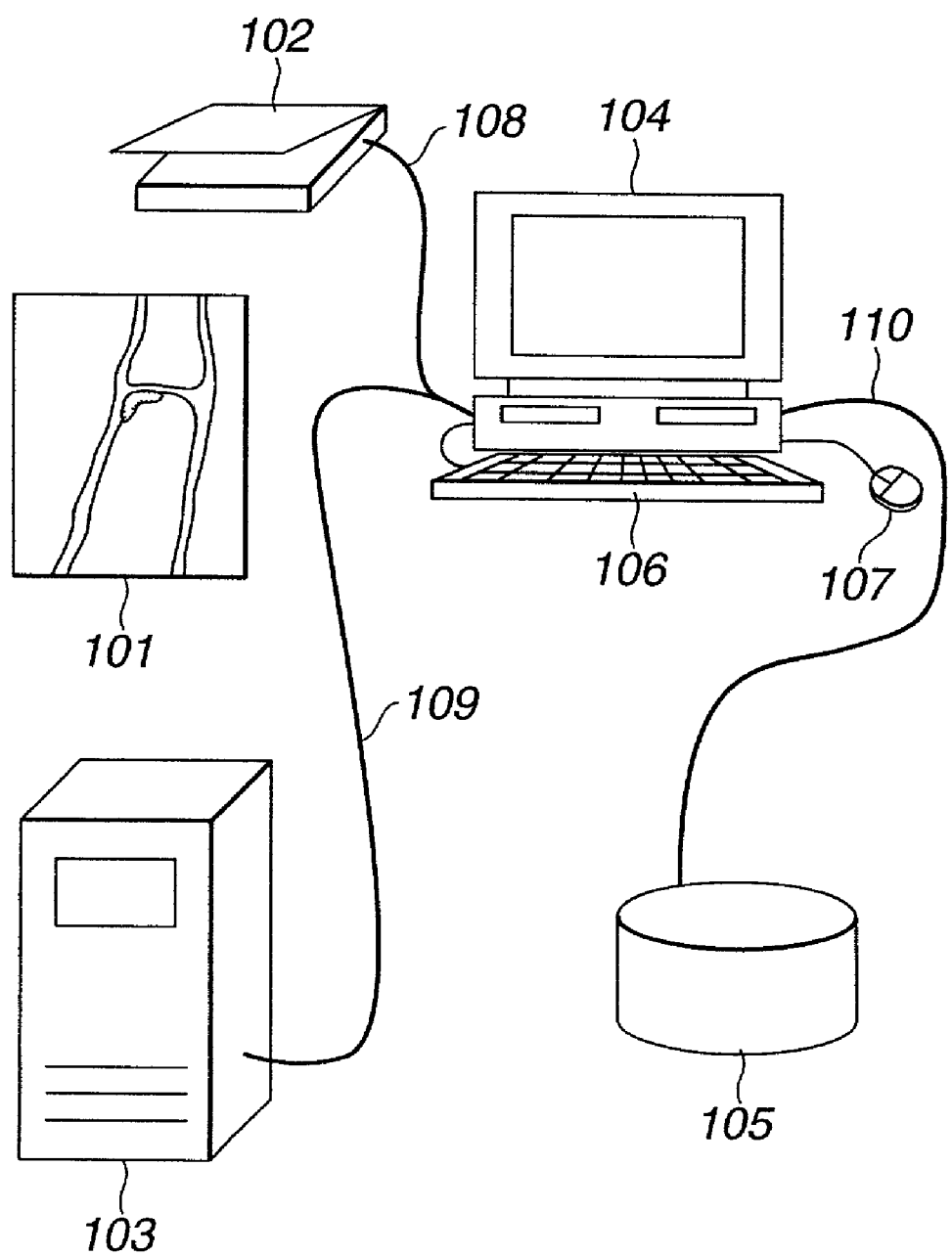
FIG. 1 is a diagram illustrating the entire configuration of a digital-watermark embedding apparatus according to a first embodiment of the present invention.

FIG. 1 illustrates how medical data of a patient is received into a computer 104.

When the origin of the medical data of the patient is analog data 101 recorded on a film (for example, an X-ray film), the analog data is digitized using a scanner 102. The digitized data is received into the computer 104 via a connection cable 108.

The apparatus for digitizing analog data is not limited to the scanner. Any other appropriate apparatus, such as a digital camera or the like, may also be used. Of course, the origin of the medical data of the patient is not always analog data. For example, already digitized diagnostic data (for example, X-ray tomographic image data reconfigured within an X-ray CT (computed tomography) system) may be directly input from a measuring apparatus 103 to the computer 104 via a connection cable 109.

The digital medical data input to the computer 104 will now be described with reference to FIG. 2.

Figure 2:
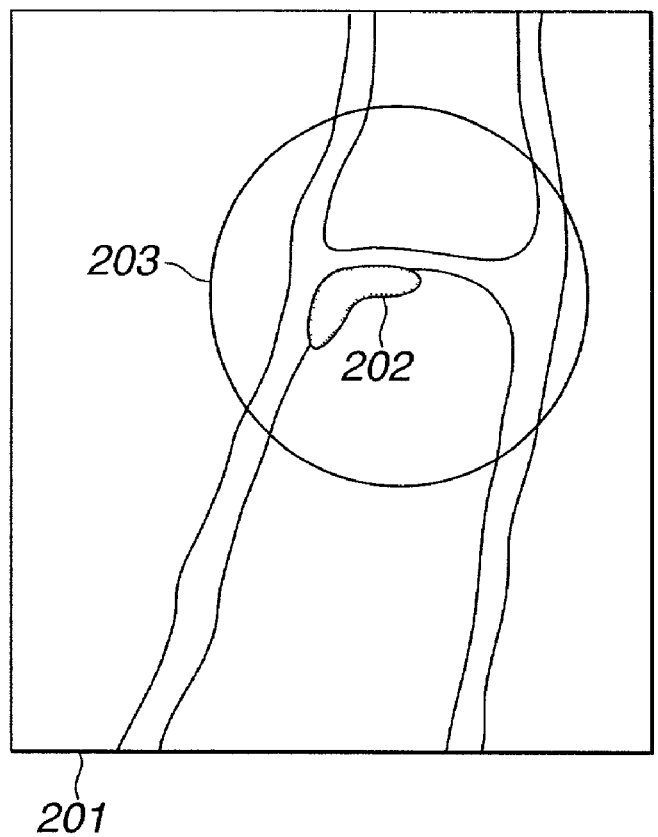
FIG. 2 is a diagram illustrating a region of interest of medical data.

When an operator (a doctor or the like) who examines digital medical data 201 input from the scanner 102 or the measuring apparatus 103 determines that a diseased part is to be examined, for example, a hatched portion 202 shown in FIG. 2, a region 203 surrounding the portion 202 is assigned as a ROI (region of interest) using a mouse 107 of the computer 104.

A digital-watermark embedding device is mounted in the computer 104 in the form of hardware or software.

The operator embeds additional information Inf in the digital medical data using the digital-watermark embedding device (in a manner such that the presence of the additional information cannot be recognized by human eyes from an image visualized from the data where the additional information is embedded).

Figure 3:
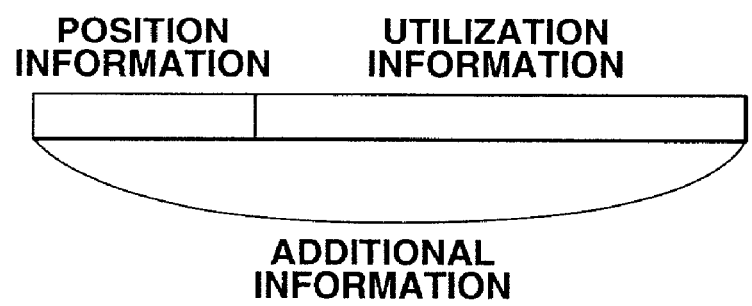
FIG. 3 is a diagram illustrating the configuration of additional information.

The configuration of the additional information Inf is, for example, as shown in FIG. 3, and includes utilization information and position information.

The utilization information includes information relating to the patient and information for controlling data after extracting a digital watermark. Specific items of the utilization information include the name of the disease, the name of the patient (or information for specifying the patient), the date of consultation, the date of birth, the method for controlling the region of interest after extraction, and the like. When the amount of the utilization information is large, a serial number, URL (Uniform Resource Locator) or the like with respect to a separately provided database where sets of utilization information are accommodated may be used.

The position information indicates the region of interest 203. Specific examples of the position information are "the region of interest is the inside of a region having a radius R around a position having coordinates (250, 300) from the upper left of the image", and "a region having luminance values between 50 and 100". When assigning a region using a free curve made by a cursor by operating a mouse, the first point may be represented by absolute coordinates, and subsequent points may be represented by relative coordinates (in order to reduce the amount of information).

In any case, after setting the region of interest 203, the operator embeds the above-described additional information in digital medical data (in a manner such that the presence of the additional information cannot be recognized by human eyes from an image visualized from data where the additional data is embedded) using a keyboard 106 and the mouse 107 of the computer 104, and uploads (or transmits or registers) the digital medical data having the embedded digital watermark in a database 105 (or in another computer) connected via a network cable 110.

Figure 4:
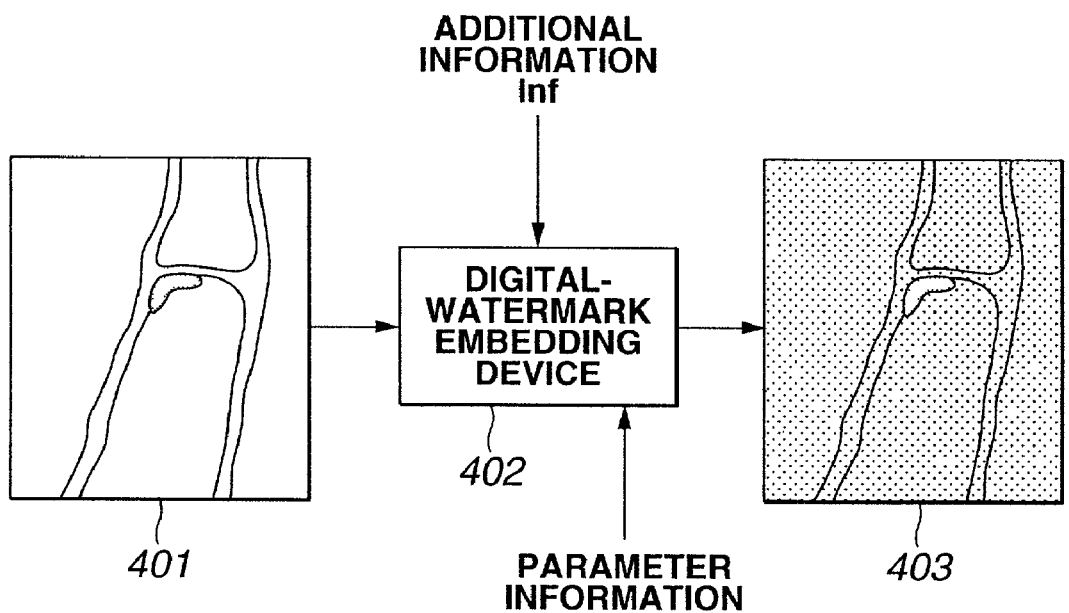
FIG. 4 is a diagram illustrating input/output to/from the digital-watermark embedding apparatus.

FIG. 4 schematically illustrates a change in medical data stored in the digital-watermark embedding device.

In FIG. 4, reference numeral 401 represents digital medical data having no degradation of the picture quality before embedding a digital watermark.

Parameter information for embedding, additional information Inf and the digital medical data 401 are input to a digital-watermark embedding device 402. The digital-watermark embedding device 402 processes the digital medical data 401, and outputs digital medical data 403 where a digital watermark is embedded.

Although degradation of the picture quality is absent in the original digital medical data 401, degradation of the picture quality is present in the digital medical data 403 after embedding the digital watermark.

However, by suppressing degradation of the picture quality due to embedding of the digital watermark to a small degree, an outline of the data can be grasped from the digital medical data 403.

Figure 6:
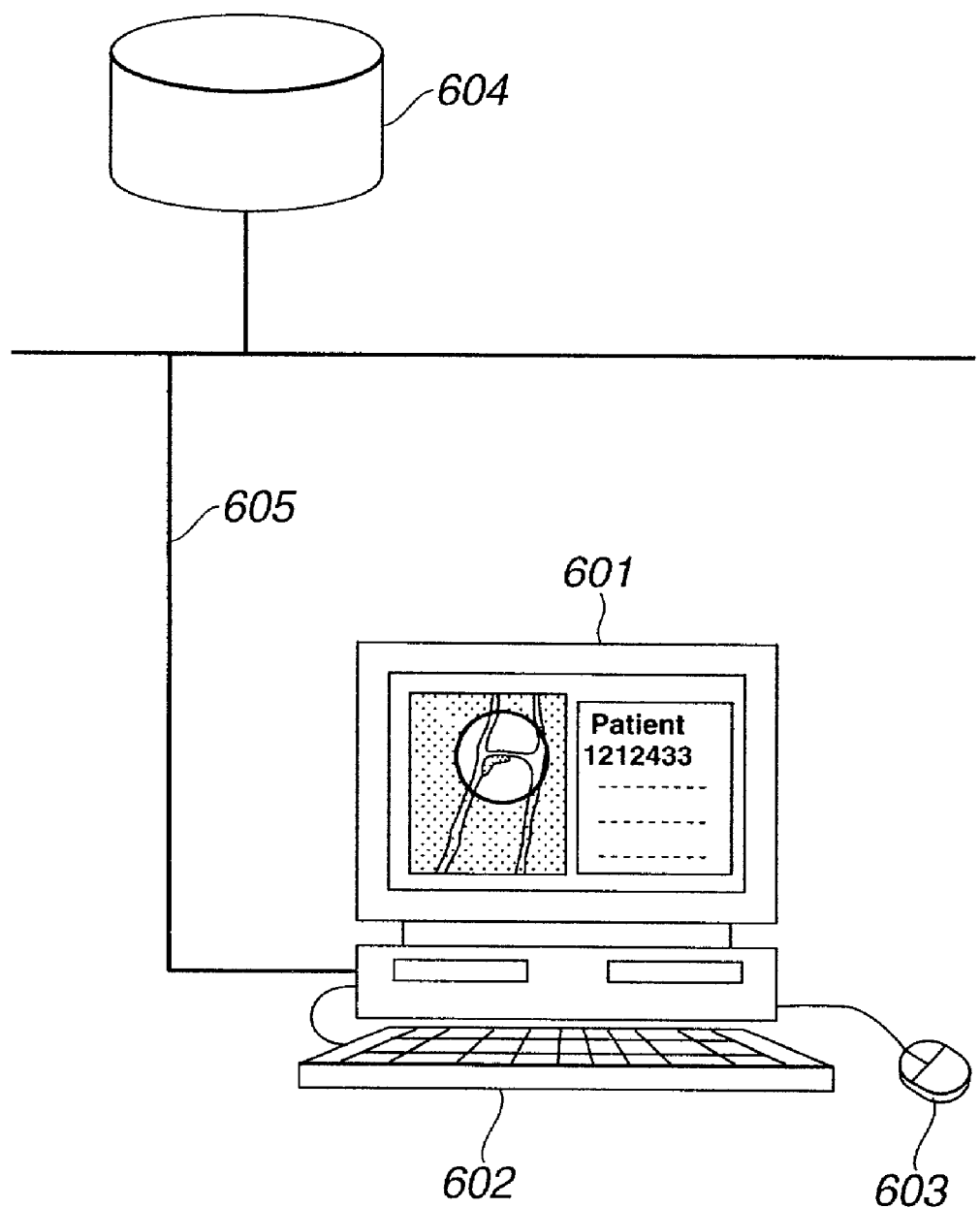
FIG. 6 is a diagram illustrating the entire configuration of the digital-watermark separation/designation apparatus.

FIG. 6 illustrates a case in which medical examination is performed using digital medical data where a digital watermark is embedded. Digital medical data having an embedded digital watermark is received into a computer 601 from a database 604 (or from another computer) where the digital medical data having the embedded digital watermark is stored via a network cable 605. The digital medical data may be received by performing retrieval by using the name or the number of the medical record of the patient, or the like as a key, and utilizing the result of the retrieval.

A digital-watermark separation/designation device is mounted in the computer 601 in the form of hardware or software.

The operator inputs the digital medical data having the embedded digital watermark in the digital-watermark separation/designation device (the computer 601), removes degradation of the picture quality due to embedding of the digital watermark, and outputs digital medical data designating a region of interest to a monitor of the computer 601. The scope of the present invention includes not only removal of a digital watermark for the entire image but also removal of a digital watermark only for a region of interest.

At the same time, additional information embedded in the digital medical data is also displayed on the monitor.

Figure 5:
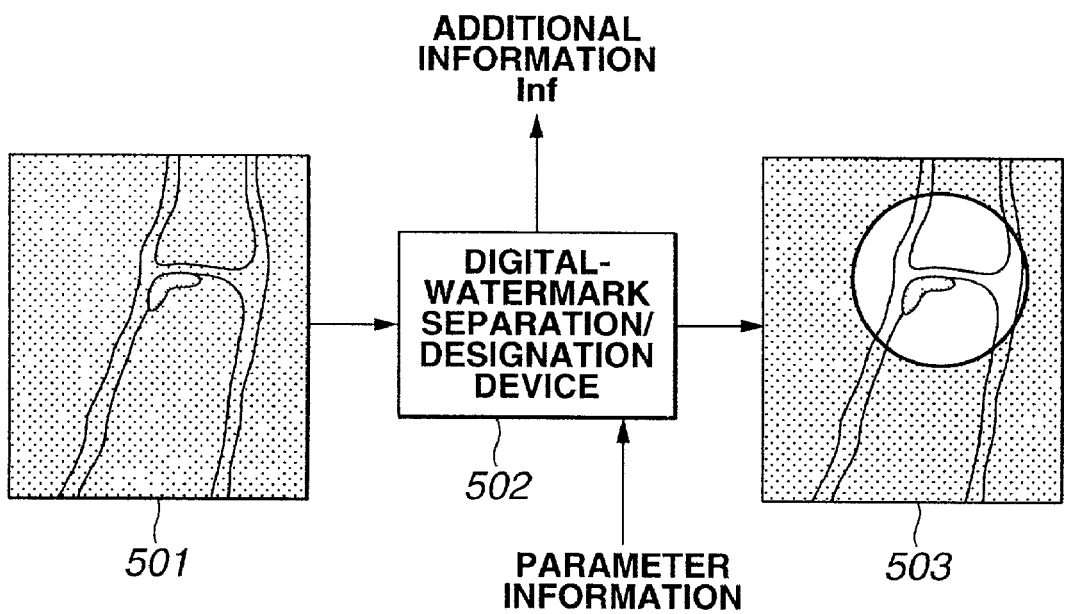
FIG. 5 is a diagram illustrating input/output to/from a digital-watermark separation/designation apparatus according to the first embodiment.

FIG. 5 illustrates the operation of a digital-watermark separation/designation device.

Parameter information for extracting additional information and digital medical data 501 having an embedded digital watermark are input to a digital-watermark separation/designation device 502 (corresponding to the computer 601 shown in FIG. 6).

The parameter information must be the same as parameter information input to the digital-watermark embedding device. Accordingly, corresponding parameters may be included within the device or within a program for separation/designation.

Additional information Inf and digital medical data 503 where the digital watermark is removed and a region of interest is designated are output from the digital-watermark separation/designation device 502.

A region where the digital watermark is removed is not limited to the entire image. A case of removing the digital watermark only from the region of interest also constitutes the present invention. The digital-watermark removal/designation device 502 designates the region of interest to the operator (doctor) based on the position of the extracted region of interest. Since information relating to the position of the diseased part and certification that the obtained data is medical data of the patient are displayed on the display picture surface from the additional information Inf, the operator can obtain necessary information.

Since degradation of the picture quality is absent in the region of interest in the digital medical data 503 where the digital watermark is removed, the doctor can perform strict medical examination.

By designating the region of interest, the doctor can effectively perform medical examination.

General operations of the present invention have been described. The configurations of the digital-watermark embedding device and the digital-watermark separation/designation device of the first embodiment will now be described in detail.

Figure 7:
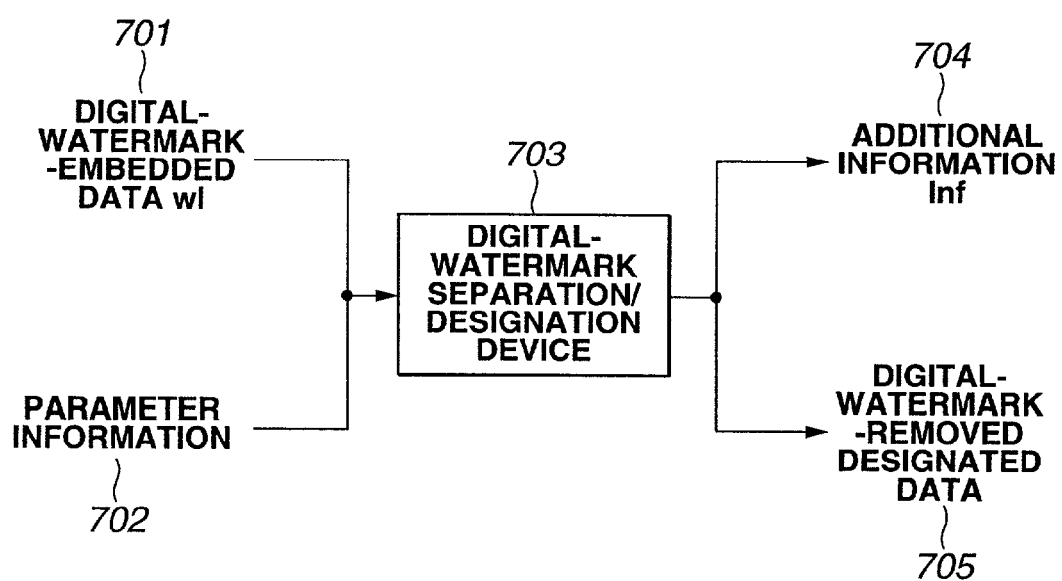
FIG. 7 is a block diagram illustrating input/output to/from the digital-watermark separation/designation apparatus.

FIG. 7 illustrates a digital-watermark separation/designation device 703 proposed in the first embodiment.

Digital-watermark embedding data wI 701 is data in which additional information Inf is embedded using the digital-watermark embedding device. Parameter information 702 is utilized when embedding the additional information Inf by the digital-watermark embedding device.

The digital-watermark-embedded data wI 701 and the parameter information 702 are input to the digital-watermark separation/designation device 703. The digital-watermark separation/designation device 703 extracts the additional information Inf embedded in the digital-watermark-embedded data wI 701 and outputs the extracted information Inf, removes degradation caused by embedding the digital watermark, and outputs digital-watermark-removed/designated data 705 designating the region of interest.

Figure 8:
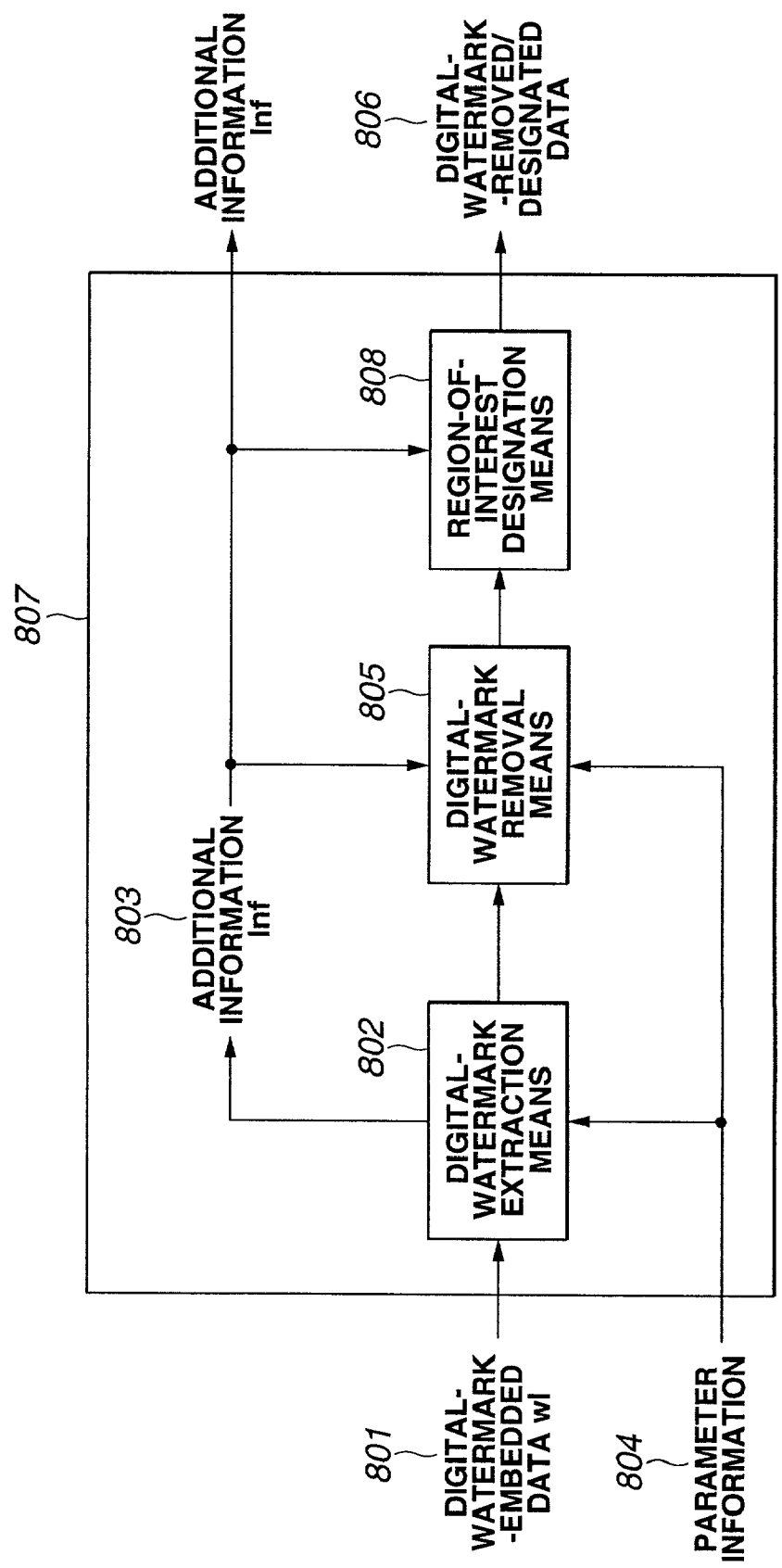
FIG. 8 is a block diagram illustrating the internal configuration of the digital-watermark separation/designation apparatus.

Next, processing performed in the digital-watermark separation/designation device 703 will be described in more detail with reference to FIG. 8.

Digital-watermark-embedded data wI 801 is input to digital-watermark extraction means 802 within the digital-watermark separation/designation device. The digital-watermark extraction means 802 extracts additional information Inf 803 from the digital-watermark-embedded data 801 based on input parameter information 804. Then, the parameter information 804, the additional information Inf 803 and the digital-watermark-embedded data wI 801 are input to the digital-watermark removal means 805.

The digital-watermark removal means 805 performs an operation inverse to an embedding operation based on the extracted additional information Inf 803, and outputs digital-watermark-removed data where the digital watermark is removed.

Then, the digital-watermark-removed data and the additional information Inf are input to a region-of-interest designation means 808, from which digital-watermark-removed/designated data 806 where the region of interest is designated is output.

The digital-watermark separation/designation device outputs the additional information Inf 803 and the digital-watermark removed/designated data 806.

An outline of the digital-watermark separation/designation device 807 proposed in the first embodiment has been described.

The method of extracting and removing a digital watermark is in close relationship with the method of embedding a digital watermark. Accordingly, first, the digital-watermark embedding device will be described.

Thereafter, the digital-watermark extraction means 802 will be described. Finally, processing performed within the digital-watermark separation/designation device 807 will be described in detail.

(1. Digital-watermark Embedding Device)

Briefly, the processing performed by the digital-watermark embedding device is to embed information in a manner such that digital medical data can be completely restored before embedding a digital watermark.

Figure 9:
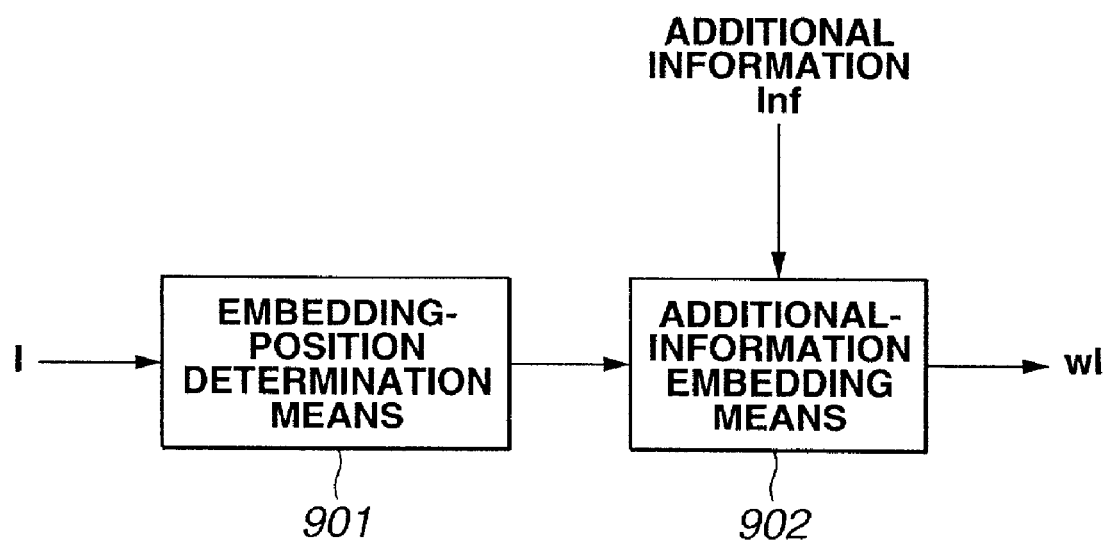
FIG. 9 is a block diagram illustrating the internal configuration of the digital-watermark embedding apparatus.

FIG. 9 is a diagram illustrating the internal configuration of the digital-watermark embedding device. The flow of the processing of the digital-watermark embedding device will now be described with reference to FIG. 9.

An original image I is input to the digital-watermark embedding device, and the position of a digital watermark to be embedded in the original image I is determined by embedding-position determination means 901. Then, the original image I is input to additional-information embedding means 902, where the digital watermark is embedded at the position determined by the embedding-position determination means 901, in accordance with additional information Inf (in a manner such that the presence of the digital watermark cannot be recognized by human eyes from an image visualized from data where the digital watermark is embedded).

For that purpose, the embedding-position determination means 901 outputs the input original image I and data representing the position to embed the additional information Inf in the image to the additional-information embedding means 902.

In addition to the original image I, the additional information Inf (information comprising a plurality of bits) is input to the additional-information embedding means 902. The additional information Inf is embedded in the determined embedding position in the original image I using a digital-watermark technique (in a manner such that the presence of the additional information cannot be recognized by human eyes from an image visualized from the data having the embedded additional information). The embedding of the additional information Inf using this digital-watermark technique will be described later. Digital-watermark-embedded data wI where the additional information is embedded is output from the additional-information embedding means 902.

In the first embodiment, in order to simplify description, data to be input to the digital-watermark embedding device is assumed to be gray-scale image data in which one pixel has 8-bit gradation levels (256 gradation levels).

Input data may be color image data. When inputting a color image, embedding can be performed in the same manner by using pixel values of one channel of the color image, luminance values of the color image, or the like.

When inputting sound data, embedding can be performed in the same manner by replacing two-dimensional position information of an image by one-dimensional information of time. When inputting moving image data, since it can be considered that a plurality of two-dimensional images are arranged on the time base, embedding can be performed by processing each of the two-dimensional images in the same manner. Accordingly, embedding of a digital watermark in a color image, a sound or a moving image also constitutes the present invention.

Next, a description will be provided of the basic principles of embedding and extraction by the digital-watermark embedding device and the digital-watermark separation/designation device, respectively, of the first embodiment.

(Patchwork Method)

In the first embodiment, a method called a patchwork method is used for embedding additional information Inf. The patchwork method is disclosed, for example, in "Data-hiding technique supporting a digital watermark (part 1)" by Walter Bender, Daniel Gruhl, Norishige Morimoto, and Anthony LU, Nikkei Electronics, Feb. 24, 1997. First, the principle of the patchwork method will be described.

In the patchwork method, embedding of additional information Inf is realized by producing a statistical deviation in an image.

The principle of the patchwork method will now be described with reference to FIG. 11. In FIG. 11, two subsets A and B are selected from a region 1102 having the same size as an original image 1101. It is assumed that the subset A includes a plurality of subsets represented by a subset $a_i$ 1103, and the subset B includes a plurality of subsets represented by a subset $b_i$ 1104.

If these two subsets A and B are not superposed on each other, embedding of additional information Inf according to the patchwork method of the first embodiment can be realized.

It is assumed that each of the subsets A and B includes N elements, i.e., $A=\{a_1, a_2, ---, a_N\}$, and $B=\{b_1, b_2, ---, b_N\}$. Each of elements $a_i$ and $b_i$ of the subsets A and B, respectively, represents a pixel or a set of pixels having a pixel value.

An index d is defined as follows:

$$d = \frac{1}{N}\sum_{i=1}^{N}(a_i - b_i),$$

which indicates the expectation of the difference of pixel values of the two sets.

When the index d is defined by selecting appropriate subsets A and B for an ordinary natural image, $$d \approx 0$$

when N is sufficiently large. This index d will be hereinafter termed a reliability distance.

When, for example, embedding bit information "1" as an operation of embedding each bit constituting additional information Inf, the following operations are performed:

$$a'_i = a_i + c$$

$$b'_i = b_i - c$$

This is an operation of adding "c" to pixel values of all elements of the subset A, and subtracting "c" from pixel values of all elements of the subset B.

In the first embodiment, the value "c" will be hereinafter termed a "depth of embedding".

As in the above-described case, when subsets A and B are selected from an image having embedded additional information Inf, and the index d is calculated, the following results are obtained:

$$d = \frac{1}{N}\sum_{i=1}^{N}(a'_i - b'_i)$$

$$= \frac{1}{N}\sum_{i=1}^{N}\{(a'_i + c) - (b'_i - c)\}$$

$$= \frac{1}{N}\sum_{i=1}^{N}(a'_1 - b'_1) + 2c$$

$$\approx 2c$$

i.e., a value separated from 0 by a constant distance.

When embedding another bit information (bit information "0"), the following operation is performed:

$$a'_i = a_1 - c$$

$$b'_i = b_i + c$$

Then, the reliability distance d becomes $$d = \frac{1}{N}\sum_{i=1}^{N}(a'_i - b'_i)$$

$$= \frac{1}{N}\sum_{i=1}^{N}\{(a'_i - c) - (b'_i + c)\}$$

$$= \frac{1}{N}\sum_{i=1}^{N}(a'_i - b'_i) + 2c$$

$$\approx -2c$$

i.e., a value separated from 0 by a constant distance in the negative direction.

That is, when an image is given, by calculating the reliability distance d for the image, it is possible to determine whether or not additional information is embedded.

If the reliability distance d≈0, it is determined that additional information is not embedded. If the reliability distance d is a positive value separated from 0 by a constant value, it is determined that bit information 1 is embedded. If the reliability distance d is a negative value separated from 0 by a constant value, it is determined that bit information 0 is embedded.

In the first embodiment, by utilizing the principle of the patchwork method, information comprising a plurality of bits is embedded (such that the presence of the information cannot be recognized by human eyes from an image visualized by data where the information is embedded).

In the first embodiment, additional information Inf comprising a plurality of bits is embedded in different regions of one image by assuming not only a combination of subsets A and B, but also a plurality of combinations such as subsets A' and B and subsets A" and B". It is necessary that the subsets A and B, A' and B', A" and B" are arranged so as not to be superposed with one another.

A method for extracting bit information from data where information comprising a plurality of bits is embedded will now be considered.

Figure 12:
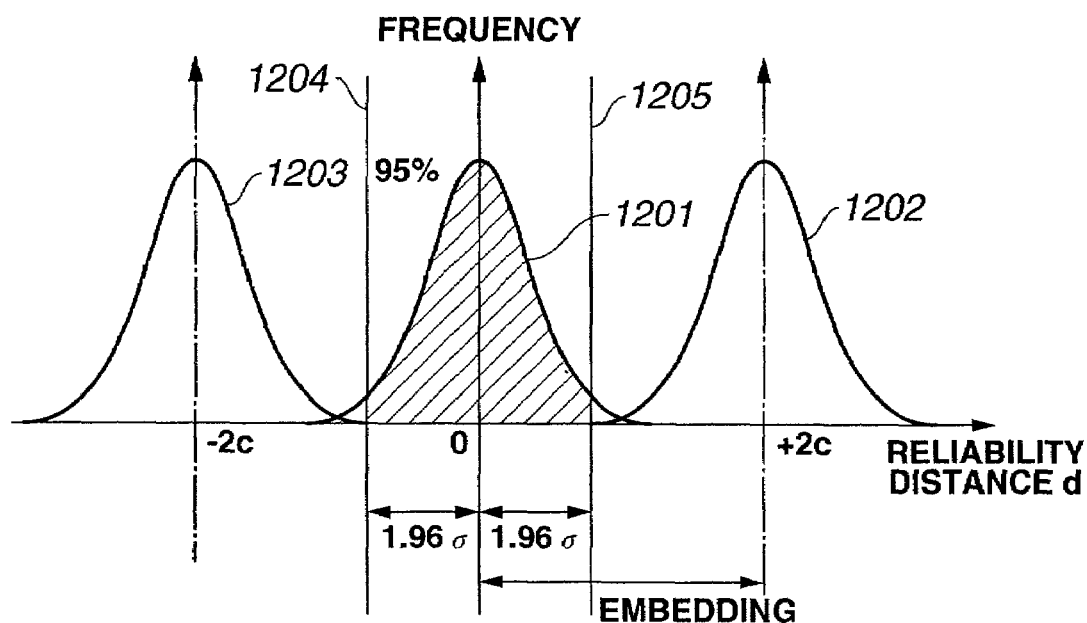
FIG. 12 is a diagram illustrating distributions of frequency of appearance of a reliability distance d during extraction of a digital watermark.

In FIG. 12, reference numeral 1201 represents the distribution of the reliability distance d calculated from data where a digital watermark is not embedded. The distribution 1201 indicates that as the value of the distribution of the frequency of occurrence corresponding to a value of the reliability distance d is larger, that reliability distance d tends to appear more frequently.

Reference numerals 1202 and 1203 represent the distributions of the reliability distance d for data where bit information 1 and 0 are embedded, respectively. As in the case of the distribution 1201, the distributions of the reliability distance 1202 and 1203 indicate that as the value of the distribution of the frequency of occurrence corresponding to a value of the reliability distance d is larger, that reliability distance d tends to appear more frequently. One reliability distance d corresponds to one bit information.

Each of the distributions 1201, 1202 and 1203 is a normal distribution. The reason why a normal distribution is obtained will now be described using the central limit theorem.

(Central Limit Theorem)

This theorem states that when extracting an arbitrary sample having a size $n_c$ from a population having a mean value $m_c$ and a standard deviation $\sigma_c$ (not necessarily a normal distribution), the distribution of the sample mean value X approaches a normal distribution N ($m_c$, $\sigma_c/\sqrt{n_c})^2$) as the value $n_c$ is larger.

In general, the standard deviation $\sigma_c$ of the population is often unknown. However, when the number $n_c$ of samples is sufficiently large and the number $N_c$ of the population is sufficiently larger than the number $n_c$ of samples, no problem arises practically even if a standard deviation s is used instead of $\sigma_c$.

In the first embodiment, the subsets A and B include each N elements as represented by A={$a_1$, $a_2$, - - - , $a_N$} and B={$b_1$, $b_2$, - - - , $b_N$}, and have pixel values of the elements of the subsets A and B as shown in FIG. 11, respectively. The expectation of the reliability distance d ($\Sigma(a_i - b_i)/N$) becomes 0 when N is sufficiently large and there is no correlation between the pixel values $a_i$ and $b_i$. In addition, the central limit theorem indicates that the distribution of the reliability distance d is a normal distribution.

Accordingly, when determining embedded bit information from the reliability distance d, by introducing an appropriate threshold between 0 and the reliability distance 2c, and determining that there is embedding when the absolute value of the reliability distance is larger than the threshold, extraction of information which is sufficiently reliable statistically can be performed.

For example, if the standard deviation of the normal distribution 1201 is represented by σ, when additional information is not embedded, the reliability distance d appears in an interval between −1.96σ and +1.96σ (a 95% confidence interval) indicated by hatching in FIG. 12.

Accordingly, if the threshold is increased, the probability of the reliability distance d appearing outside of the threshold becomes low, so that extraction of information with high reliability can be performed.

If the depth of embedding "c" is increased, the normal distributions 1202 and 1203 are separated from 0, so that the threshold can be increased.

If the number N of elements of each of the subsets A and B is increased, the standard deviations σ of the normal distributions 1201, 1202 and 1203 decrease. Hence, reliability is improved even with the same depth of embedding c.

The basic concept of the patchwork method has been described.

In the first embodiment, the digital-watermark embedding device and the digital-watermark separation/designation device use the above-described patchwork method.

Specific methods for embedding, extracting and removing a digital watermark will now be described.

(1-1 Embedding-position determination means)

In the patchwork method, since additional information comprising a plurality of bits is embedded, subsets A and B are necessary for one set of bit information. Accordingly, when embedding a plurality of sets of bit information, it is necessary to determine the positions of A and B, A' and B', A" and B", - - - .

The embedding-position determination means 901 shown in FIG. 9 determines embedding positions necessary for embedding a plurality of bits. In a simple embedding-position determination method, embedding positions are determined using random numbers. It is preferable to embed subsets in good balance in the entire image such that the elements of respective subsets are substantially equal in a state in which the subsets are not superposed on each other.

As an example, a method of utilizing a white-noise mask having the same size as the image will be briefly described.

Pixels are two-dimensionally arranged in the white-noise mask, and each of the pixels has coefficients 0-255. Pixels of the same number are allocated to each of the coefficients 0-255.

Accordingly, when embedding 1-bit additional information, if pixels having an odd gradation level are allocated to a subset A and pixels having an even gradation level are allocated to a subset B, the elements of the subsets A and B are equal and are not superposed on each other, to allow to embed the subsets A and B in good balance in the entire image.

When embedding information comprising M bits, by setting the number of pixels allocated to each bit to be equal (for example, by dividing the pixel value of the white-noise mask by 2M, and using the remainder for the subset A or B), a plurality of sets of bit information can be embedded.

(1-2 Additional-information Embedding Means)

As described above, the original image I, the additional information Inf, and the embedding position for each bit determined by the embedding-position determination means 902 are input to the additional-information embedding means 902.

The pixel values of pixels of the subset A and B corresponding to each bit are operated in accordance with bit information constituting the input additional information Inf.

As described in the patchwork method, when bit information is 1, "c" is added to the pixel value of the pixel of the subset A, and "c" is subtracted from the pixel value of the pixel of the subset B. When bit information is 0, "c" is subtracted from the pixel value of the pixel of the subset B, and "c" is added to the pixel value of the pixel of the subset B. The additional-information embedding means 902 embeds the additional information Inf according to the above-described operation.

(2 Digital-watermark Extraction Means)

Next, an outline of the digital-watermark extraction means 802 of the digital-watermark separation/designation device shown in FIG. 8 will be described.

Figure 10:
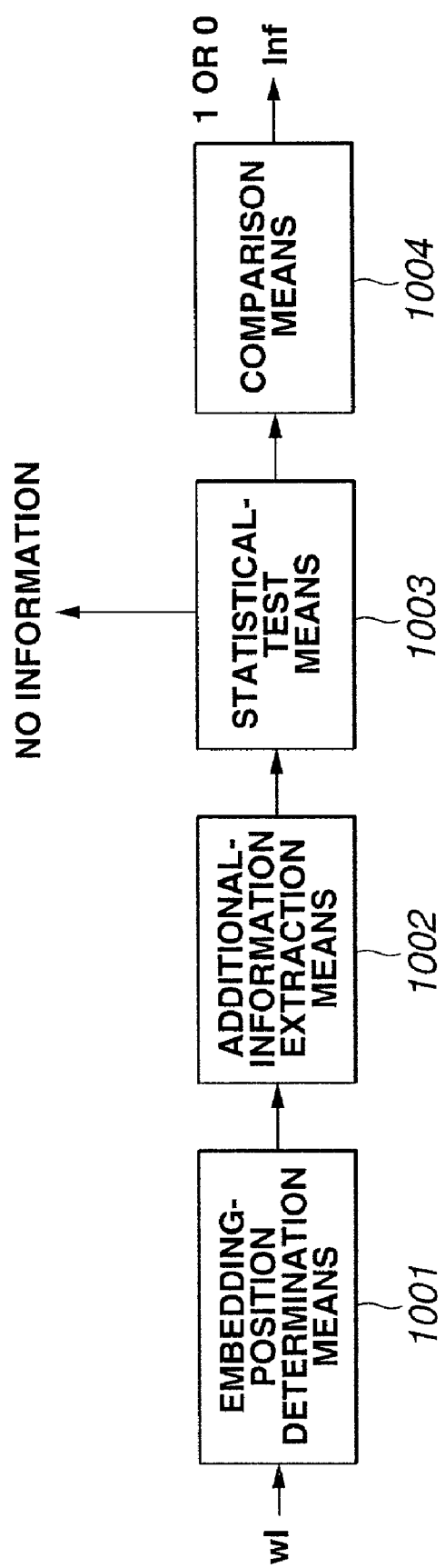
FIG. 10 is a block diagram illustrating the internal configuration of a digital-watermark extraction apparatus according to the first embodiment.

FIG. 10 illustrates the internal configuration of the digital-watermark extraction means 802 of the first embodiment.

As shown in FIG. 10, the digital-watermark extraction means 802 includes embedding-position determination means 1001, additional-information extraction means 1002, statistical-test means 1003 and comparison means 1004. In the first embodiment, it is assumed that digital-watermark-embedded data wI input to the digital-watermark extraction means 802 is the same as digital-watermark-embedded data wI output from the digital-watermark embedding device.

First, the digital-watermark-embedded data wI is input to the digital-watermark extraction means 802. Then, the embedding-position determination means 1001 generates information relating to the position where a digital watermark is embedded. The additional-information extraction means 1002 calculates the reliability distance d corresponding to additional information Inf embedded in the image data wI, by performing predetermined processing for the digital-watermark-embedded data based on the input information relating to the position where the digital watermark is embedded. The statistical-test means 1003 statistically tests the probability of data corresponding to the additional information Inf calculated by the additional-information extraction means 1002. When it has been determined that the additional information Inf is sufficiently correct, the additional information Inf is extracted by the comparison means 1004. When it has been determined that the probability of the additional information Inf is low, absence of information is output.

Next, the operation of the digital-watermark extraction means 802 for extracting the additional information Inf from the digital-watermark-embedded data wI where the additional information Inf is embedded by the additional-information embedding means 902 will be described in detail.

(2-1 Embedding-position Determination Means)

The embedding-position determination means 1001 determines from which region of the image data wI the additional information Inf is to be extracted. This operation by the embedding-position determination means 1001 is the same as the above-described operation by the embedding-position determination means 901. Hence, the position determined by the embedding-position determination means 1001 is the same as the position determined by the embedding-position determination means 901.

(2-2 Additional-information Extraction Means)

The additional-information extraction means 1002 calculates the reliability distance d corresponding to each bit from the embedding position determined by the embedding-position determination means 1001.

(2-3 Statistical-test Means)

The statistical-test means 1003 statistically tests the probability of the reliability distance d corresponding to each bit information output from the additional-information extraction means 1002. When information comprising a plurality of bits is embedded, a plurality of reliability distances d are obtained. In FIG. 12, when the additional information Inf is embedded, values of the reliability distance d appear at positions around a position 2c separated from the center 0.

In this case, in FIG. 12, as the depth of embedding c is larger, the reliability distance d appears at a position more separated from the center 0. Accordingly, by introducing a threshold at the position "c", it can be determined that when a reliability distance d larger than "c" is obtained, the embedded bit information is 1, and when a reliability distance d smaller than –c is obtained, the embedded bit information is 0.

Accordingly, as the depth of embedding "c" is larger when embedding additional information, intervals between the normal distribution 1201, and the normal distributions 1202 and 1203 increase, so that reliability of extracted information becomes higher. In addition, as the number N elements of the subsets A and B is larger, the standard deviations of the normal distributions 1201, 1202 and 1203 become smaller. Accordingly, by increasing the depth of embedding "c" and the number N of elements of the subsets A and B, reliability of extracted information can be high even when the threshold is "c".

When performing reliable embedding and extraction, it is necessary to provide a more strict description. However, since such an approach is not directly related to the present invention, the foregoing brief description will suffice. Since the reliability distance d when embedding is absent appears (tends to appear) entirely in a small interval between –c and c, determination is performed utilizing the appearing reliability distance d.

That is, the statistical-test means 1003 of the first embodiment determines that information is not embedded when at least certain values of the reliability distance d corresponding to a plurality of bits appear in the range between –c and c.

(2-4 Comparison Means)

The value of the reliability distance d corresponding to each bit information output via the additional-information extraction means 1002 and the statistical-test means 1003 is input to the comparison means 1004 shown in FIG. 10.

Since the reliability distance d corresponding to each bit information input to the comparison means 1004 has high reliability, it is only necessary to simply determine whether the bit information is "1" or "0" from the positive or negative sign of the reliability distance d corresponding to each bit information.

More specifically, when the reliability distance d of certain bit information constituting the additional information Inf is larger than "c", the bit information is determined to be "1", and when the reliability distance is smaller than "−c", the bit information is determined to be "0".

The additional information Inf obtained as a result of the determination is output as reference information for the user or final data for providing a control signal.

A series of processing from embedding to extraction of additional information has been described.

The outlines of the digital-watermark embedding device and the digital-watermark extraction means which are indispensable for describing the digital-watermark separation/designation means of the first embodiment have been described.

(3 Digital-watermark Removal Means)

Next, the digital-watermark removal means 805 of the digital-watermark separation/designation means of the first embodiment shown in FIG. 8 will be described in detail.

Additional information Inf, digital-watermark-embedded data 801 and parameter information are input to the digital-watermark removal means 805.

The digital-watermark removal means 805 removes a digital watermark in the region of interest indicated by position information of the additional information, and outputs digital-watermark-removed data I'.

Figure 13:
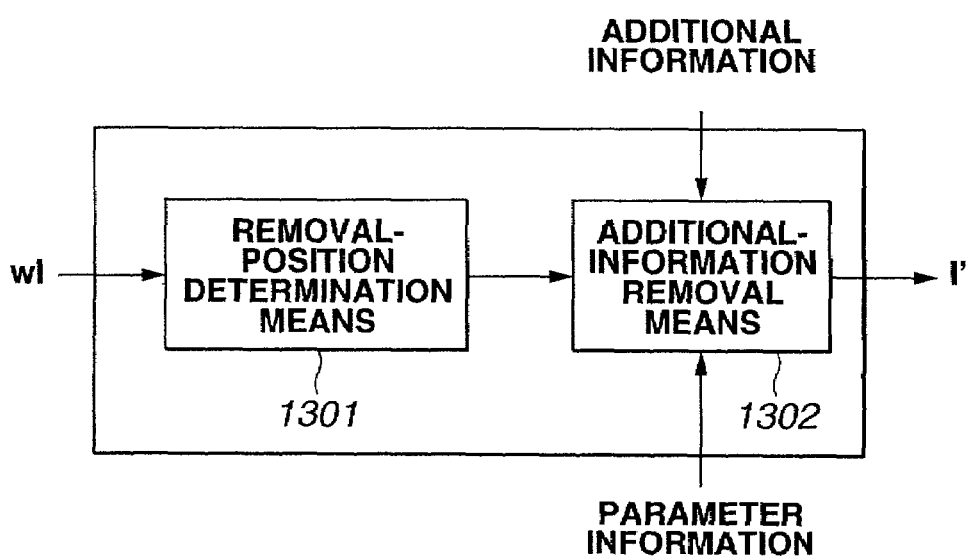
FIG. 13 is a block diagram illustrating the internal configuration of digital-watermark removal means.

FIG. 13 illustrates the internal configuration of the digital-watermark removal means 805. The operation of the digital-watermark removal means 805 will now be described with reference to FIG. 13.

(3-1 Removal-position Determination Means)

Digital-watermark-embedded data wI is input to removal-position determination means 1301. The removal-position determination means 1301 determines the position where a digital watermark is embedded, using the same means as the embedding-position determination means 901 and 1001 in the digital-watermark embedding device and the digital-watermark extraction device, respectively.

The removal-position determination means 1301 outputs the position where the additional information Inf is embedded and the digital-watermark-embedded data wI to the additional-information removal means 1302.

(3-2 Additional-information Removal Means)

Next, operations performed in the additional-information removal means 1302 will be described.

The position where the additional information Inf is embedded, the digital-watermark-embedded data wI, the additional information Inf and parameter information are input from the removal-position determination means 1301 to the additional-information removal means 1302.

The removal-position determination means 1301 removes the additional information by adding a value obtained by inverting the sign of the depth of embedding c at embedding to a subset corresponding to each bit at the same position as when embedding has been performed by the additional-information embedding means 902 of the digital-watermark embedding device.

More specifically, when bit information is 1 at a position to embed predetermined bit information constituting the additional information Inf, the following processing is performed:

$$a'_i = a_i - c$$

$$b'_i = b_1 + c,$$

and when bit information is 0, the following processing is performed:

$$a'_i = a_i + c$$

$$b'_i = b_i - c,$$

thus, it is possible to restore data to pixel values before embedding.

By performing the above-described operations, the additional-information removal means 1302 removes the digital watermark from the digital-watermark-embedded data wI, and outputs digital-watermark-removed data.

However, when the value of the original image I where embedding is to be performed is within the following ranges in the digital-watermark embedding device:

$$0 \leq a_i, \ b_i < c$$

$$255 - c < a_i, \ b_i \leq 255,$$

pixel values after embedding the additional information Inf are saturated at the lower limit 0 and the upper limit 255. As a result, the depth of embedding c is not constant. Hence, it is impossible to restore the original image by the digital-watermark removal means.

In general, the pixel value of each pixel of the original image I input to the additional-information embedding mean 902 of the digital-watermark embedding device is desirably within a range of $c \leq a_i$, and $b_i \leq 255 - c$.

This is because, even if additional information Inf is embedded, the pixel value is present within the range of $c \leq a_i$, and $b_i \leq 255 - c$, and additional information can be removed by adding a value obtained by inverting the sign of the depth of embedding c at embedding, as described above.

However, it can be considered that an image having pixel values which are not within the range of $c \leq a_i$, and $b_1 \leq 255 - c$ may sometimes exist.

A description will now be provided of countermeasures when pixel values of the original image I are not within the range of $c \leq a_i$, and $b_i \leq 255 - c$.

Figure 16:
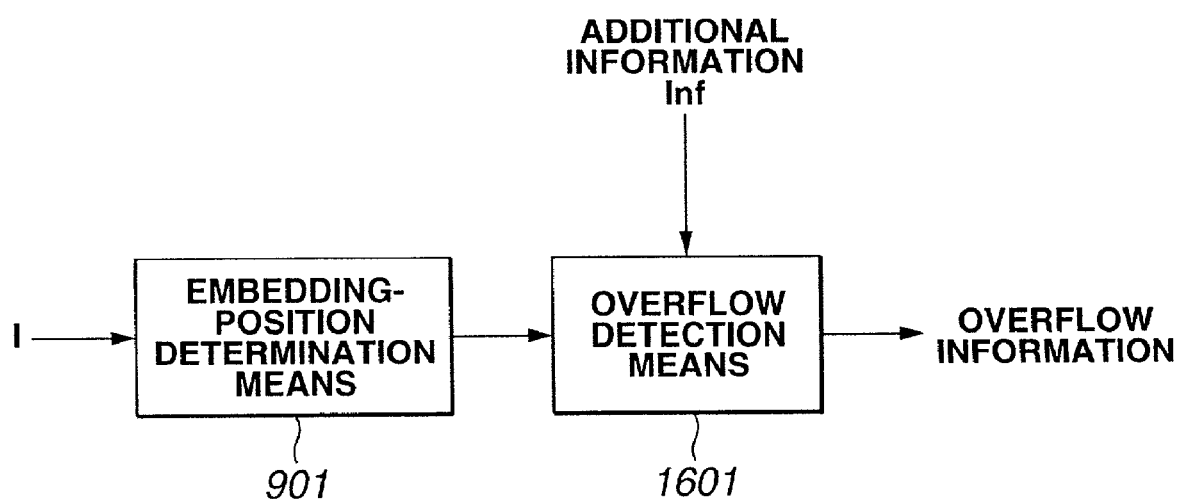
FIG. 16 is a block diagram illustrating the internal configuration of overflow-information generation means.

FIG. 16 illustrates the internal configuration of overflow-information generation means.

Overflow information is information for restoring the original image I even if the pixel values of the input image are not within the range of $c \leq a_i$, and $b_i \leq 255 - c$.

The overflow-information generation means includes embedding-position determination means 901 and overflow detection means 1601.

The overflow detection means 1601 detects position information relating to a pixel whose pixel value is not within the range of $c \leq a_i$, and $b_1 \leq 255 - c$ after operating the pixel value at the embedding position determined by the embedding-position determination means 901, in accordance with the additional information Inf, and outputs the position information of the pixel and an amount of overflow as overflow information.

The amount of overflow is defined by the difference between the depth of embedding (c or −c) for embedding the additional information Inf and the actual amount of embedding (c' or −c').

Figure 17:
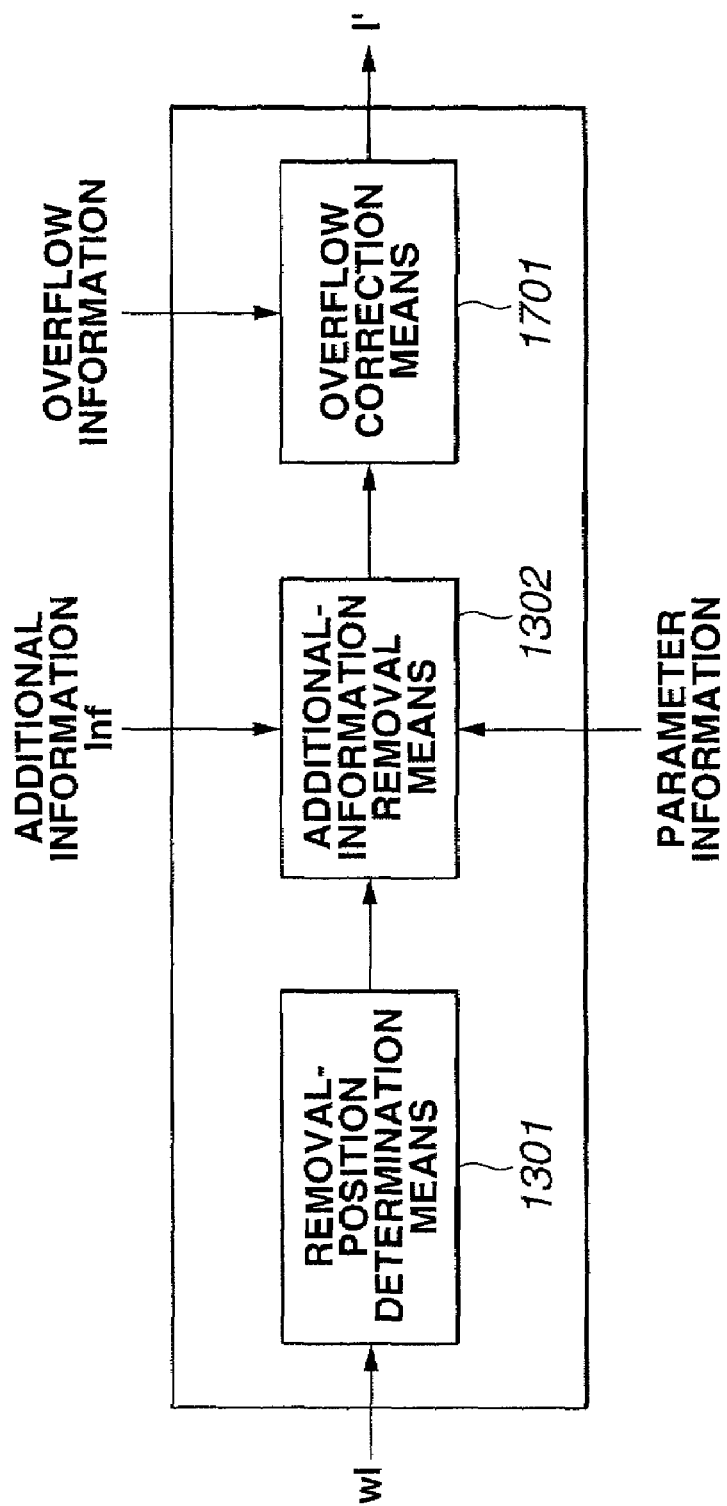
FIG. 17 is a block diagram illustrating the internal configuration of digital-watermark removal means in which countermeasures for overflow are provided.

When restoring an original image from an image having an embedded digital watermark, additional-information removal means obtained by adding overflow correction means 1703 after additional-information removal means 1302 of digital-watermark removal means shown in FIG. 17 is utilized.

An image having pixel values within a range of $-c \leq a_i$, and $b_i \leq 255-c$ obtained by inverting the sign of the depth of embedding c at embedding is input from the additional-information removal means 1302 to an overflow correction means 1703 shown in FIG. 17.

The overflow correction means 1703 adds the amount of overflow to the overflow position of the input image based on input overflow information. As a result, an original image I is output from the overflow correction means 1703.

Although in the first embodiment, a medical image is illustrated, a case in which information relating to a region of interest is also embedded in a digital image other than a medical image may also be considered.

In such a case, by arranging the pixel values of the input image within the range of $c \leq a_i$, and $b_i \leq 255-c$, it is possible to make key information unnecessary.

In the case of a medical image, also, when the value c is so small as not to influence degradation of the image quality, this method can be applied.

Figure 18:
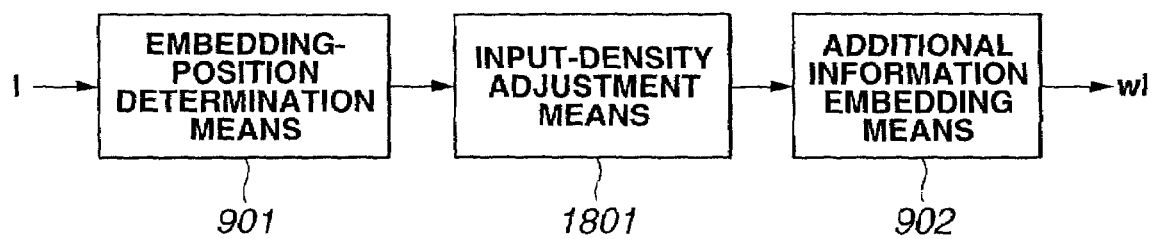
FIG. 18 is a block diagram illustrating the internal configuration of a digital-watermark embedding apparatus including input-density adjustment means.

FIG. 18 is a diagram obtained by inserting input-density adjustment means 1801 between the embedding-position determination means 901 and the additional-information embedding means 902 of the digital-watermark embedding device shown in FIG. 9.

When operating the pixel value at the embedding position determined by the additional-information-embedding-position determination means 901 based on additional information Inf, the input-density adjustment means 1801 detects a pixel whose pixel value is not within the range of $c \leq a_i$, and $b_i \leq 255-c$, and changes the pixel values of pixels $a_i$ and $b_i$ within a range of $a_i$, $b_i < c$ to c, and the pixel values of pixels $a_i$ and $b_i$ within a range of $a_i$, $b_i > 255-c$ to $255-c$ so that the pixel values are within the range of $c \leq a_i$, and $b_i \leq 255-c$, and outputs the resultant pixel values to the additional-information embedding means 902 at the succeeding stage.

When the digital-watermark embedding device has the configuration shown in FIG. 18, it is possible to restore an image to which adjustment has been performed by the input-density adjustment means 1801, using the digital-watermark removal device shown in FIG. 13.

The digital-watermark extraction means and the digital-watermark removal means constituting the digital-watermark separation/designation device have been described in detail.

(4 Region-of-interest Designation Means)

The digital-watermark separation/designation device of the first embodiment has a feature in that processing of designating a region of interest is performed in accordance with position information and utilization information of additional information after removing a digital watermark from digital-watermark-embedded data wI.

For example, it is a great advantage for the side to examine digital medical data to designate the region of interest by emphasizing the border of the region of interest after removing a digital watermark.

It can also be considered to be effective to perform various types of image processing for the region of interest in accordance with utilization information, in addition to designate the region of interest.

Since image processing for the region of interest may cause a wrong diagnosis, such processing must be carefully performed. However, it is sufficiently effective to perform processing, such as edge emphasis, noise removal, adjustment of brightness and contrast (gradation correction), in order to make the state of the region of interest more easily observable, for a diseased part which is difficult to be find.

In the first embodiment, when a region of interest is not specified, the entire region of the image may be made a region of interest.

As described above, in the first embodiment, the method for storing both main data, such as digital medical data or the like, and subdata, such as additional information of the medical data, using the digital watermark technique, and the method for separating the main data and the subdata whenever necessary have been proposed.

If image data having embedded additional information is processed, it is difficult to restore the original image. However, the digital-watermark embedding device of the first embodiment can embed a very resistive digital watermark, and can extract additional information Inf even after various types of attacks.

Accordingly, even if image data is processed/changed or sent to a third party without consent, it is possible to realize certification of a user from extracted additional information Inf.

Figure 14:
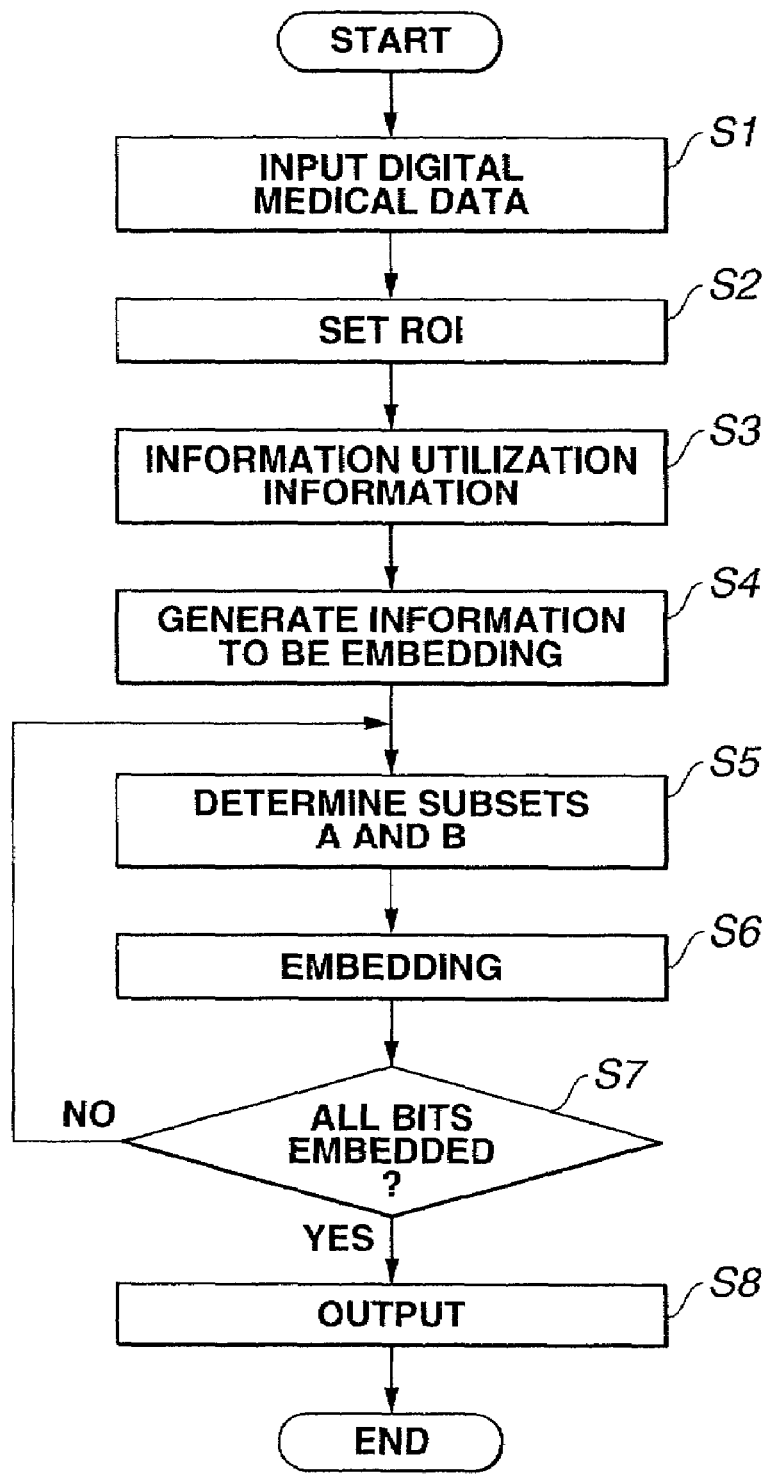
FIG. 14 is a flowchart illustrating an operation procedure of an apparatus at the digital-watermark embedding side.
Figure 15:
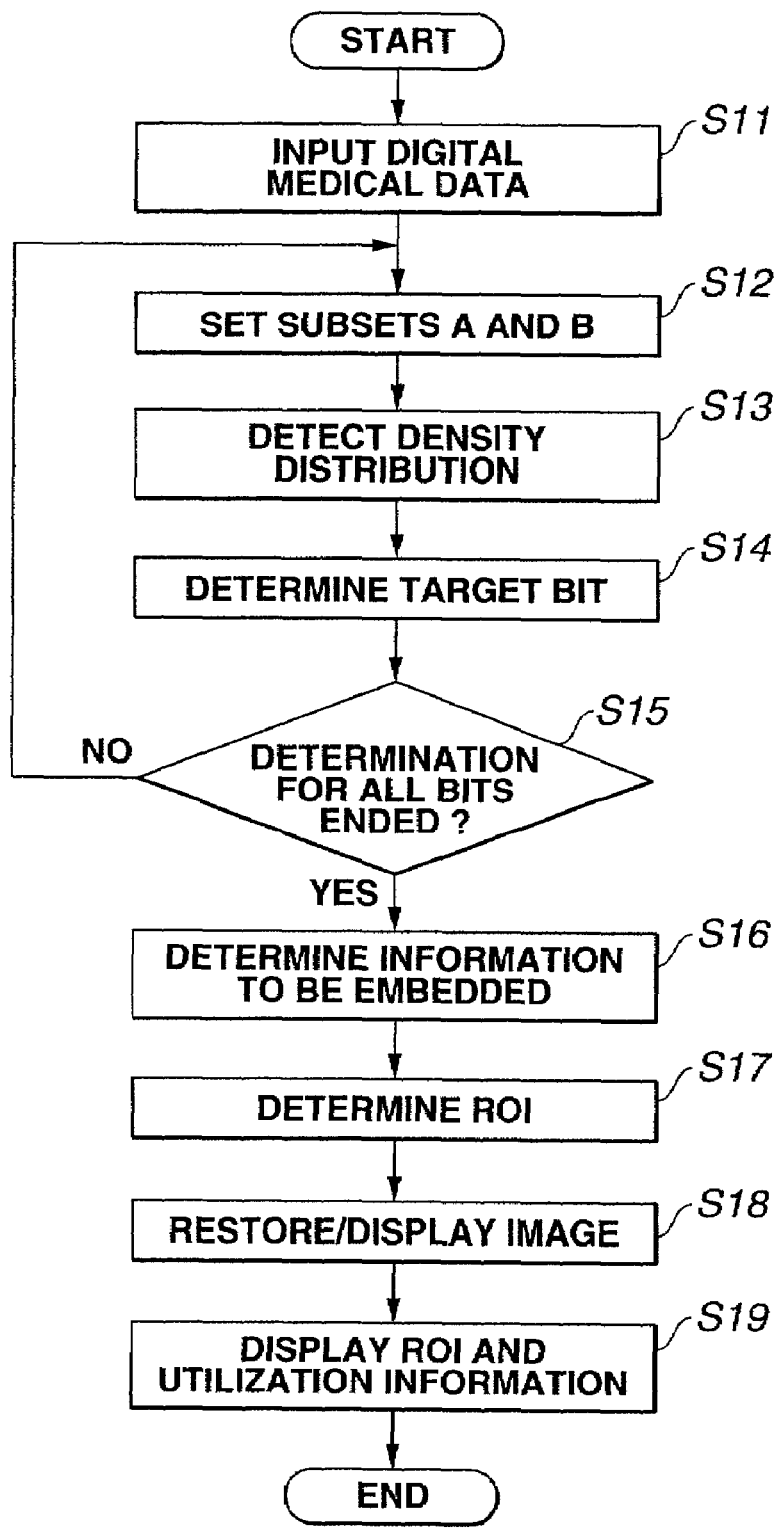
FIG. 15 is a flowchart illustrating an operation procedure of an apparatus at the digital-watermark extraction side.

Processing performed by an apparatus at the side to embed additional information Inf and processing performed by an apparatus for restoring original digital medical data by extracting the additional information Inf from data obtained from the embedding apparatus will now be described with reference to the flowcharts shown in FIGS. 14 and 15, respectively. Corresponding programs are, of course, stored in these apparatuses.

First, the operation procedure of the apparatus at the side of embedding additional information Inf will be described with reference to the flowchart shown in FIG. 14.

In step S1, medical data is input as digital medical data (original medical data). The data may be input from an apparatus (a scanner) for converting analog information into digital data, or may be digital data generated by a medical apparatus.

Then, in step S2, a region of interest is set by outputting the data (display in the case of an image, and a waveform in the case of a sound or the like). In step S3, utilization information is input by obtaining it through a keyboard, or a database server on a network. In step S4, additional information Inf (bit information to be embedded) is generated based on the information input in step S2 and S3.

In step S5, the above-described subsets A and B are determined according to a predetermined method in order to embed first bit information. In step S6, the bit information is embedded. The processing of steps S5 and S6 is repeated until it is determined that all bits have been embedded.

When embedding of the additional information Inf has thus been completed, the digital medical data having an embedded digital watermark is output to a medical database or the like. However, the digital medical data may be simply output as a file.

Next, the operation of the apparatus at the side to restore original digital medical data will be described with reference to the flowchart shown in FIG. 15.

First, in step S11, digital medical data is input. Although the digital medical data is generally input to a medical database, there is no particular limitation for the destination of the digital medical data.

Then, in step S12, subsets A and B are set in order to extract embedded bits. Then, in step S13, the density distribution of each of the subsets A and B is detected. Then, in step S14, by checking the distribution of the reliability distance d in each of the detected subsets A and B, it is determined whether the target bit is "1" or "0". In step S15, it is determined if the determination processing has been performed for all bits. The processing of steps S12-S14 is repeated until the result of the determination in step S15 becomes affirmative. As described above, when the absolute value of the distribution of the reliability distance is equal to or less than a predetermined value, it may be determined that embedding is absent, and the process may be immediately terminated.

When extraction of all embedded bits of the data has thus been completed, the process proceeds to step S16, where additional information Inf is generated from the extracted bit information group. Then, in step S17, position information relating to a region of interest (ROI) is extracted from the additional information Inf.

Then, in step S18, the original digital medical data is restored by performing correction processing inverse to the processing at embedding for the subsets A and B for each bit, in accordance with the states of all of the extracted bits, and the restored data is output (displayed). Then, in step S19, in order to indicate in which portion of the restored and displayed digital medical data the ROI is present, the region is designated based on the extracted position information of the ROI, and processing of displaying utilization information is performed. As described above, if the utilization information is the URL, the information may be extracted and output by accessing the server in accordance with the URL.

Second Embodiment

In a second embodiment of the present invention, a description will be provided of a case in which the technique of the first embodiment is applied, and additional information Inf including position information of a region of interest (ROI) is embedded only in the region of interest in a digital-watermark embedding device.

Actually, the region of interest may be or may not be a portion which can be recognized from an original image at a glance. In the latter case, a portion from which a digital watermark is to be extracted must be assumed using an appropriate method. In this case, whether or not the assumption is correct can be determined by referring to the position information included in the digital watermark (additional information Inf). If the position information substantially coincides with the position of extraction of the digital watermark, the reliability of the additional information Inf is high.

By using the above-described function, it is possible to determine whether or not the contents of the image have been changed at the position of the region of interest by someone.

In order to achieve the above-described objects, in the second embodiment, a digital-watermark separation/designation device includes region-of-interest-reliability determination means for determining whether or not position information in image data from which additional information Inf has been extracted coincides with position information of a region of interest within the additional information Inf.

In the second embodiment, also the same reversible digital-watermark technique as in the first embodiment is used, and additional information Inf includes position information relating to a region of interest, and utilization information. A digital-watermark embedding device and a digital-watermark separation/designation device will now be described in detail.

Figure 19:
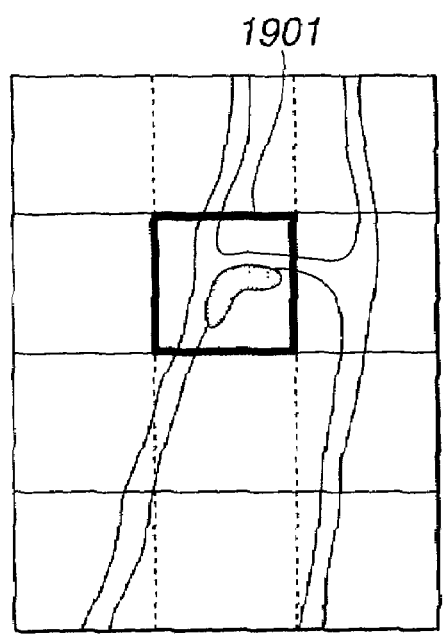
FIG. 19 is a diagram illustrating the position of a region of interest in a second embodiment of the present invention.

The digital-watermark embedding device will now be briefly described with reference to FIG. 19. FIG. 19 illustrates a state in which a medical image including a region of interest (diseased part) is divided into a plurality of blocks. In FIG. 19, a block 1901 including the region of interest (diseased part) is a square region having a size comprising M pixels in the vertical and horizontal directions. The digital-watermark embedding device embeds additional information Inf including position information in the region of interest. At that time, the additional information Inf is not embedded in blocks other than the region of interest.

The configuration of the digital-watermark embedding device of the second embodiment differs from the configuration of the digital-watermark embedding device of the first embodiment in that the additional information Inf is embedded only in the region of interest. Since the configuration is entirely the same as the configuration of the first embodiment in other portions, further description thereof will be omitted.

Next, the digital-watermark separation/designation device will be described.

Figure 21:
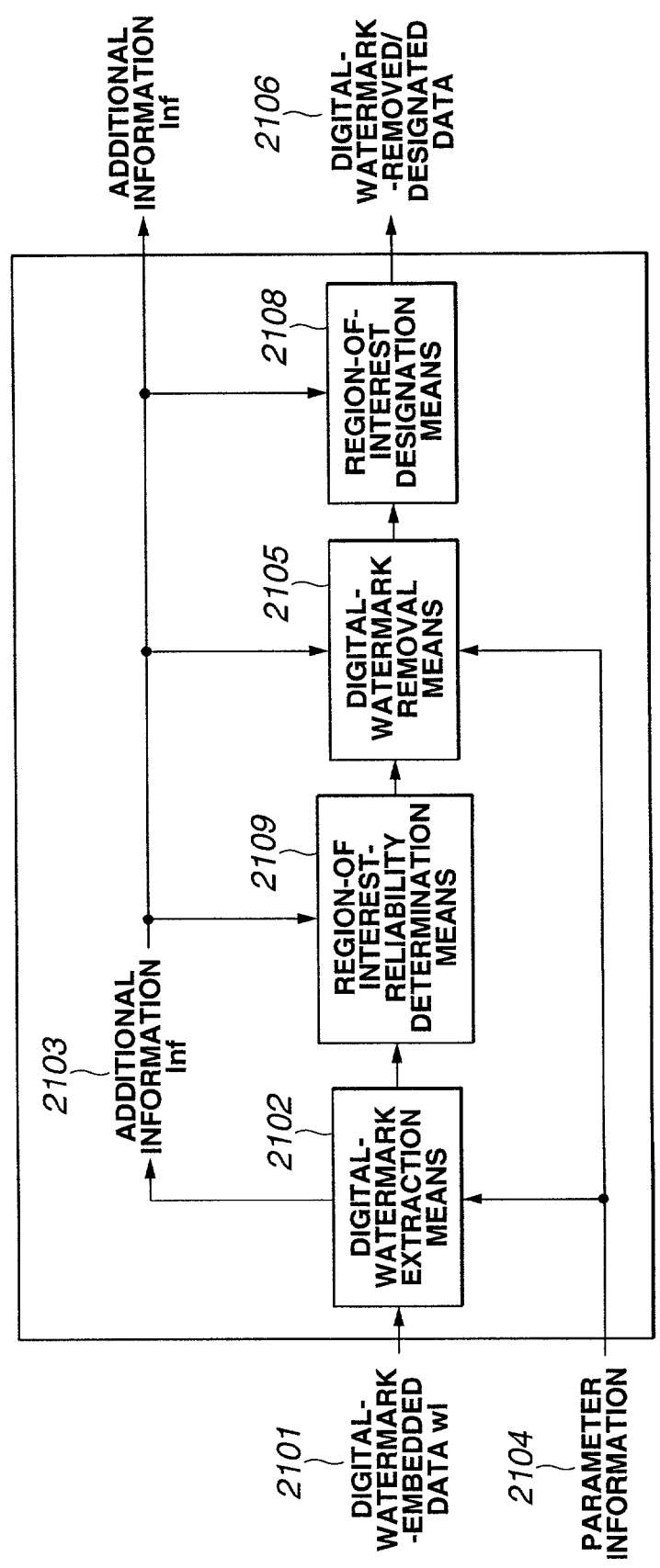
FIG. 21 is a block diagram illustrating the internal configuration of a digital-watermark separation/designation apparatus according to the second embodiment.

FIG. 21 illustrates the internal configuration of the digital-watermark separation/designation device of the second embodiment.

Digital-watermark-embedded data wI is input to digital-watermark extraction means 2102 together with parameter information 2104 used when embedding a digital watermark.

The digital-watermark extraction means 2102 assumes or assigns the region of interest where the additional information Inf is embedded, from the digital-watermark-embedded data wI 2101, and at the same time extracts the additional information Inf.

The digital-watermark extraction means 2102 outputs the digital-watermark-embedded data wI, position information relating to the region of interest, and the extracted additional information Inf to region-of-interest-reliability determination means 2109 at the succeeding stage.

The region-of-interest-reliability determination means 2109 determines whether or not the position of the assumed region of interest is correct, or whether or not a wrong change has been performed for the position of the region of interest, by comparing the position information within the additional information Inf with information relating to the position where the additional information Inf has been extracted.

When it has been determined that the position of the assumed region of interest is incorrect, or a wrong change has been performed for the position of the region of interest, the processing of the digital-watermark separation/designation device is interrupted, and an error is notified, or a warning indicating that a change has been performed for the position of the region of interest is displayed.

When the position of the assumed region of interest is correct, or a wrong change has not been performed for the position of the region of interest, the digital-watermark-embedded data wI is output to digital-watermark removal means 2105 at the succeeding stage.

The additional information Inf, the digital-watermark-embedded data wI, and the parameter information 2104 are input to the digital-watermark removal means 2105.

The digital-watermark removal means 2105 removes the digital watermark in the region of interest indicated by the position information of the additional information Inf, and outputs digital-watermark-removed data. Since the internal processing of the digital-watermark removal means 2105 is substantially the same as the internal processing of the digital-watermark removal means 805 described in the first embodiment, further description thereof will be omitted.

The digital-watermark-removed data and the additional information Inf are input to region-of-interest designation means 2108, which outputs digital-watermark removed/designated data 2106 designating the region of interest. Since the internal processing of the region-of-interest designation means 2108 is substantially the same as the internal processing of the region-of-interest designation means 808 described in the first embodiment, further description thereof will be omitted.

The digital-watermark separation/designation device (FIG. 21) of the second embodiment differs from the digital-watermark separation/designation device (FIG. 8) of the first embodiment in two points, i.e., the internal configuration of the digital-watermark extraction means 2102, and the presence of the region-of-interest-reliability determination means 2109.

The internal processing of each of the digital-watermark extraction means 2102 and the region-of-interest-reliability determination means 2109 will now be described in detail.

Figure 22:
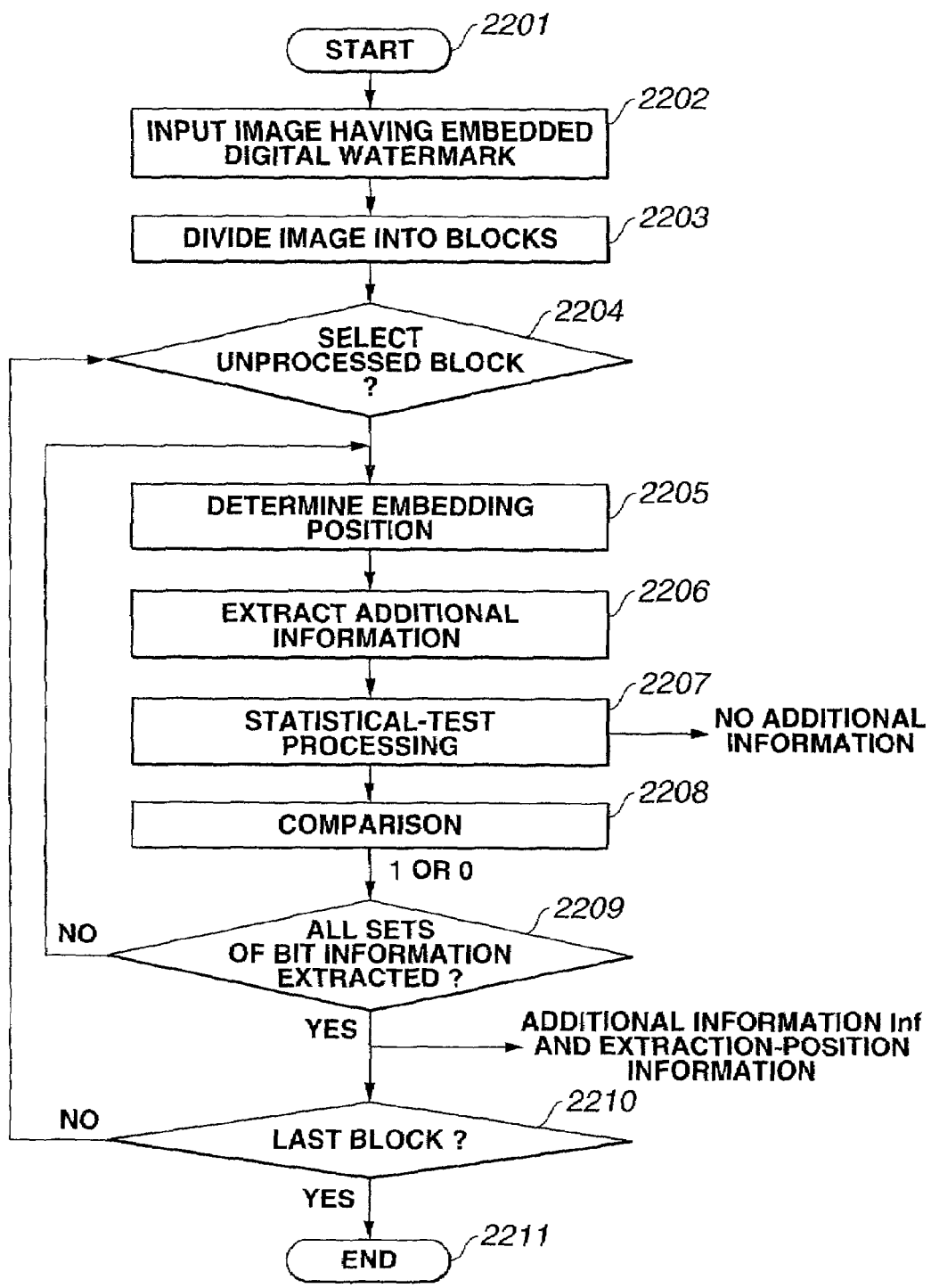
FIG. 22 is a flowchart illustrating an operation procedure of digital-watermark extraction means in the second embodiment.

FIG. 22 is a flowchart illustrating the internal processing procedure of the digital-watermark extraction means 2102. In the second embodiment, since a digital watermark is embedded only in the region of interest, the digital-watermark extraction means 2102 must assume/assign the region of interest where the additional information Inf is embedded, from the entire image.

First, in step 2202, an image having embedded digital watermark is input.

Then, in step 2203, the image having the embedded digital watermark is divided into a plurality of blocks, in order to specify a block corresponding to the region of interest at a high speed. The region of interest can be specified by searching for the region of interest everywhere from the upper left to the lower right without utilizing the step of dividing the image into blocks, although much time is required for the search.

Then, in step 2204, an unprocessed block for which processing for extracting the additional information has not yet performed is selected.

Then, in step 2205, the position where a digital watermark is embedded within the unprocessed block selected in step 2204 is determined. The processing performed in step 2205 is substantially the same as the processing of setting the subsets A and B in step S12 shown in FIG. 15.

Then, in step 2206, the reliability distance d for each bit is calculated based on the algorithm of the patchwork method described in the first embodiment. This processing is substantially the same as the processing performed by the additional-information extraction means 1002 shown in FIG. 10.

Then, in step 2207, by comparing the reliability distance d calculated in the additional-information extraction processing of step 2206 with an appropriate threshold, the probability of bit information is statistically tested. When it has been determined that the reliability distance d corresponding to bit information is statistically improbable, it is determined that bit information (additional information Inf) is not embedded.

When it has been determined that the reliability distance d corresponding to bit information is statistically probable, the process proceeds to step 2208, where bit information 1 or 0 is determined and output from the positive or negative sign of the reliability distance d.

In step 2209, it is determined if all sets of bit information of the additional information Inf have been extracted. The processing of steps 2204-2208 is repeated until all sets of bit information of the additional information Inf have been extracted.

In step 2210, it is determined if an unprocessed block is present in all of the blocks divided from the image having the embedded digital watermark. If the result of the determination in step 2210 is affirmative, the process returns to step 2204, and the above-described processing of steps 2204-2209 is repeated.

The additional information Inf and the information relating to the position of the region of interest obtained at the processing of steps 2204-2208 are stored in an appropriate storage medium in order to be used by the region-of-interest-reliability determination means 2109 provided at the succeeding stage.

Figure 20:
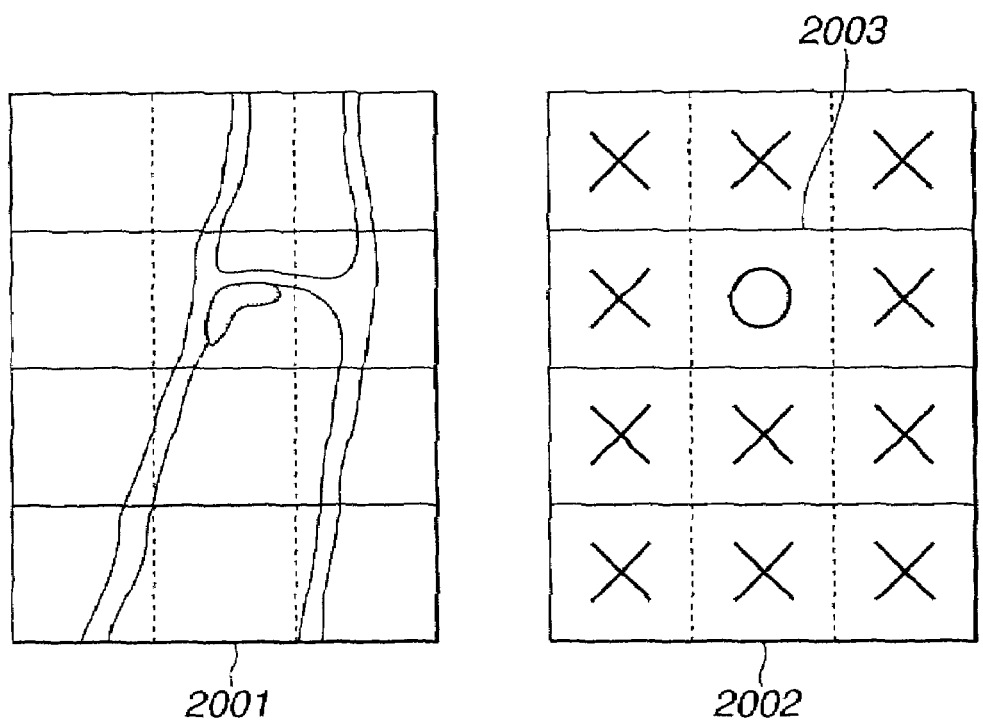
FIG. 20 illustrates a process of specifying the position of the region of interest in the second embodiment.

The processing of steps 2201-2211 by the digital-watermark extraction means 2102 will now be described using drawings shown in FIG. 20.

A frame 2001 illustrates the state in which the image having the embedded digital watermark is divided into blocks in step 2203. In a frame 2002, whether or not the additional information Inf has been extracted in corresponding blocks in the frame 2001 is indicated by marks ○ and X within the blocks.

A block where the mark ○ is present indicates the region of interest where the additional information Inf has been extracted, and each block where the mark X is present indicates a block where the additional information Inf has not been extracted.

(5 Region-of-interest-reliability Determination Means)

Figure 23:
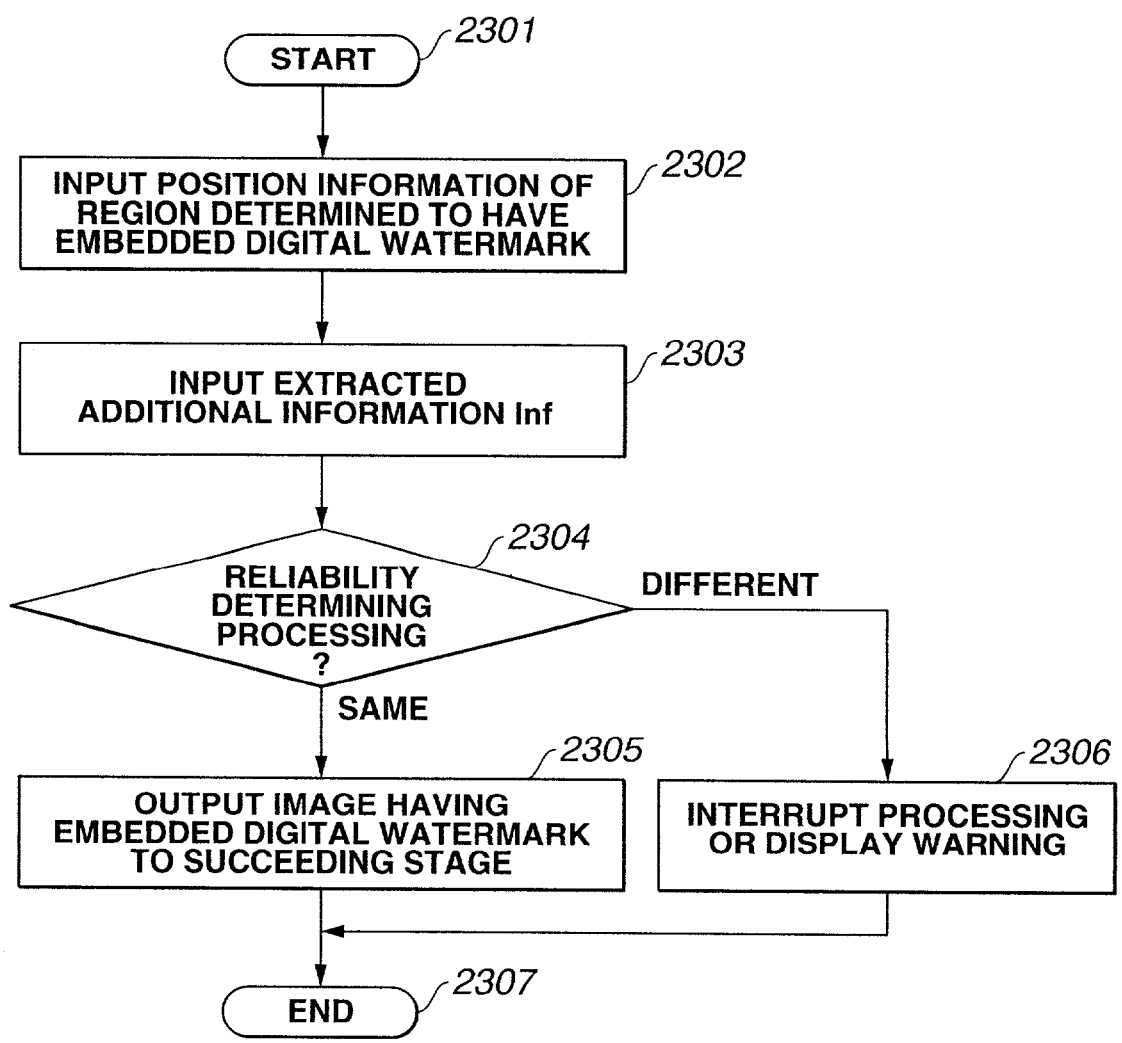
FIG. 23 is a flowchart illustrating an operation procedure of region-of-interest-reliability determination means.

FIG. 23 is a flowchart illustrating the internal processing of the region-of-interest-reliability determination means 2109. First, in step 2302, the position information of the region where the additional information Inf has been extracted is input. Then, in step 2303, the extracted additional information Inf (position information within the additional information Inf) is input.

In step 2304, the position information of the region of interest where the additional information Inf has been input that has been input in step 2302 is compared with the position information within the additional information Inf input in step 2303. When it has been determined that the two regions of interest are the same as a result of comparison of the position of extraction of the additional information Inf with the position information within the additional information Inf, the process proceeds to step 2305, where the image having the embedded digital watermark is output to the digital-watermark removal means 2105 shown in FIG. 21.

When it has been determined that the two regions of interest are not the same, the process proceeds to step 2306, where the processing of the digital-watermark separation/designation device is interrupted, and an error is notified or a warning indicating that a change has been performed for the position of the region of interest is displayed. Then, in step 2307, the internal processing of the region-of-interest-reliability determination means 2109 is terminated.

In the second embodiment, it is desirable that the region of interest is large enough so that statistical extraction of additional information Inf according to the patchwork method can be sufficiently performed. Accordingly, in the second embodiment, it is desirable to provide a relatively large region of interest.

In the second embodiment, it is also desirable that the shape and the size of the region of interest are provided in advance as parameter information.

In the second embodiment, since a summary of data can be assumed in advance from data having no degradation obtained from regions other than the region of interest, the picture quality of the region of interest may be degraded by relatively increasing the intensity of embedding of the digital watermark. At that time, the effect of hiding the region of interest by intentional degradation of the picture quality may also be provided.

(Modification)

In the above-described embodiments, additional information Inf subjected to error correction encoding may be used, in order to further improve the reliability of the extracted additional information Inf.

The present invention may be applied to a part of a system comprising a plurality of apparatuses, or to a part of a single apparatus (such as a copier or a facsimile apparatus).

The present invention is not limited to an apparatus or a method for realizing the above-described embodiments, but a case in which each of the above-described embodiments is realized by supplying a computer (a CPU (central processing unit) or an MPU (microprocessor unit)) within the above-described system or apparatus with program codes of software for realizing each of the above-described embodiments, and causing the computer of the system or the apparatus to operate the above-described devices in accordance with the program codes also constitutes the present invention.

In such a case, the program codes realize the functions of the above-described embodiments, so that the program codes, means for supplying the computer with the program codes, and more specifically, a storage medium storing the program codes, constitute the present invention.

For example, a floppy disk, a hard disk, an optical disk, a magnetooptical disk, a CD(compact disc)-ROM (read-only memory), a magnetic tape, a nonvolatile memory card, a ROM or the like may be used as the storage medium for storing such program codes.

Such program codes also constitute the present invention not only in a case in which the functions of the above-described embodiments are realized by controlling the respective devices by the computer only in accordance with the supplied program codes, but also in a case in which the functions of the above-described embodiments are realized by the program codes in cooperation with an OS (operating system) operating in the computer, other application software or the like.

The present invention may also be applied to a case in which, after storing the supplied program codes in a memory provided in a function expanding board of a computer or in a function expanding unit connected to the computer, a CPU or the like provided in the function expanding board or the function expanding unit performs a part or the entirety of actual processing based on instructions of the program codes, and the functions of the above-described embodiments are realized by the processing.

Although in the above-described embodiments, the case of embedding digital-watermark information using image data has been illustrated, the present invention is not limited to such a case.

Although an embedding method which does not depend on main data has been illustrated, the present invention may also be applied to a case in which subdata is embedded such that it depends on main data, because a digital-watermark separation/designation device can be realized if a rule of performing a change in accordance with original-signal data is applied to parameter information.

A configuration which includes at least one of the above-described features also constitutes the present invention.

As described above, according to the above-described embodiments, not only main data and subdata are combined using a digital-watermark technique, but also a request for security such that evidence for digital data must be provided is satisfied. When main data free from degradation of the picture quality is necessary, by separating main data and subdata, and performing processing of a designated region of interest assigned by the subdata according to an instruction of the subdata, examination of the main data is assisted.

As described above, according to the present invention, it is possible to provide a technique of assuredly providing image data with the position of a region of interest in an image represented by the image data. It is also possible to provide a method for effectively using such region information. It is also possible to exactly restore original digital data in a case in which the original digital data represents a medical image.

Furthermore, by embedding additional information including position information of a region of interest only in the region of interest, and comparing the embedded information with a position of the image where the additional information has been extracted, reliability of the position information of the region of interest can be confirmed.

The individual components shown in outline or designated by blocks in the drawings are all well known in the information processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   input means for inputting original digital image information;
   region assignment means for assigning a desired region in an image represented by the digital image information;
   embedding means for embedding additional information in the assigned region and detecting position information of a pixel which is overflowed and an amount of overflow caused by embedding the additional information; and
   output means for outputting the position information of the pixel which is overflowed and the amount of overflow detected by the embedding means as overflow information,
   wherein the embedding means embeds the additional information so that offset values having different signs are added in at least two subsets in the digital image information, for each bit constituting the additional information, and the original digital information is restored by adding offset values with signs inverse to the signs of the offset values added during embedding, in the at least two subsets.

2. A method for controlling an information processing apparatus, said method comprising:
an input step of inputting original digital image information;
a region assignment step of assigning a desired region in an image represented by the digital image information;
an embedding step of embedding additional information in the assigned region and detecting position information of a pixel which is overflowed and an amount of overflow caused by embedding the additional information; and
an output step of outputting the position information of the pixel which is overflowed and the amount of overflow detected in the embedding step as overflow information,
wherein the embedding step embeds the additional information so that offset values having different signs are added in at least two subsets in the digital image information, for each bit constituting the additional information, and the original digital information is restored by adding offset values with signs inverse to the signs of the offset values added during embedding, in the at least two subsets.

3. A storage medium storing computer-executable program codes, said program codes comprising:
program code of an input step of inputting original digital image information;
program code of a region assignment step of assigning a desired region in an image represented by the digital image information;
program code of an embedding step of embedding additional information in the assigned region and detecting position information of a pixel which is overflowed and an amount of overflow caused by embedding the additional information; and
program code of an output step of outputting the position information of the pixel which is overflowed and the amount of overflow detected in the embedding step as overflow information,
wherein the embedding step embeds the additional information so that offset values having different signs are added in at least two subsets in the digital image information, for each bit constituting the additional information, and the original digital information is restored by adding offset values with signs inverse to the signs of the offset values added during embedding, in the at least two subsets.

4. An information processing apparatus comprising:
input means for inputting original digital image information;
display means for displaying an image represented by the digital image information;
region assignment means for assigning a desired region in the displayed image;
embedding means for embedding additional information in the assigned region and detecting position information of a pixel which is overflowed and an amount of overflow caused by embedding the additional information; and
output means for outputting the position information of the pixel which is overflowed and the amount of overflow detected by the embedding means as overflow information,
wherein the embedding means embeds the additional information so that offset values having different signs are added in at least two subsets in the digital image information, for each bit constituting the additional information, and the original digital information is restored by adding offset values with signs inverse to the signs of the offset values added during embedding, in the at least two subsets.

5. An information processing apparatus according to claim 4, wherein the digital image information is medical digital image information.

6. A method for controlling an information processing apparatus, said method comprising:
an input step of inputting original digital image information;
a display step of displaying an image represented by the digital image information;
a region assignment step of assigning a desired region in the displayed image;
an embedding step of embedding additional information in the assigned region and detecting position information of a pixel which is overflowed and an amount of overflow caused by embedding the additional information; and
an output step for outputting the position information of the pixel which is overflowed and the amount of overflow detected in the embedding step as overflow information,
wherein the embedding step embeds the additional information so that offset values having different signs are added in at least two subsets in the digital image information, for each bit constituting the additional information, and the original digital information is restored by adding offset values with signs inverse to the signs of the offset values added during embedding, in the at least two subsets.

7. A storage medium storing computer-executable program codes, said program codes comprising:
program code of an input step of inputting original digital image information;
program code of a display step of displaying an image represented by the digital image information;
program code of a region assignment step of assigning a desired region in the displayed image;
program code of an embedding step of embedding additional information in the assigned region and detecting position information of a pixel which is overflowed and an amount of overflow caused by embedding the additional information; and
program code of an output step of outputting the position information of the pixel which is overflowed and the amount of overflow detected in the embedding step as overflow information,
wherein the embedding step embeds the additional information so that offset values having different signs are added in at least two subsets in the digital image information, for each bit constituting the additional information, and the original digital information is restored by adding offset values with signs inverse to the signs of the offset values added during embedding, in the at least two subsets.

8. An information processing apparatus for removing additional information embedded in digital image information from the digital image information and restoring original digital image information, said apparatus comprising:

extraction means for extracting the additional information embedded in the digital image information from the digital image information;

removing means for removing the additional information embedded in the digital image information from the digital image information by using the extracted additional information; and restoring means for restoring the original digital image information from the digital image information having the additional information removed therefrom, by using information of overflowing position and an amount of overflow when embedding and correcting the overflow that occurred when embedding, wherein said extraction means comprises:

first calculation means for calculating a characteristic value of the digital image information;

second calculation means for calculating a characteristic value of at least two subsets, for each bit when the additional information is embedded in the digital image information; and determination means for determining embedded bit information from a difference between the characteristic value calculated by said first calculation means and the characteristic value calculated by said second calculation means, wherein said extraction means extracts the additional information based on a result of determination by said determination means.

9. An information processing apparatus according to claim 8, wherein said restoring means reproduces the original digital image information by adding offset values having different signs to the at least two subsets corresponding to each bit, based on the bit information of each bit determined by said determination means, and an output means performs an emphasized display for a region surrounding a region of interest in the image represented by the original digital image information, wherein the region of interest is based on the additional information.

10. An information processing apparatus according to claim 9, further comprising means for performing gradation correction of an image within the region surrounding the region of interest.

11. An information processing apparatus according to claim 9, further comprising means for performing edge emphasis of an image within the region surrounding the region of interest.

12. An information processing apparatus according to claim 9, further comprising means for removing noise in an image within the region surrounding the region of interest.

13. An information processing apparatus according to claim 8, further comprising:

assignment means for assigning a position where the additional information is embedded, in an image represented by the digital image information; and determination means for determining reliability of a result of the assignment by comparing a region of interest indicated by the additional information extracted by said extraction means with the assigned position.

14. An information processing apparatus according to claim 8, wherein the characteristic value calculated by said first calculation means and the characteristic value calculated by said second calculation means are mean values.

15. An information processing apparatus according to claim 8, wherein, when an absolute value of a difference between a mean value calculated by said first calculation means and a mean value calculated by said second calculation means is equal to or less than a predetermined threshold, it is determined that the additional information is not embedded in the digital image information.

16. A method for controlling an information processing apparatus for removing additional information embedded in digital image information from the digital image information and restoring original digital image information, said method comprising:

an extraction step of extracting additional information embedded in the digital image information from the digital image information;

a removing step of removing the additional information embedded in the digital image information from the digital image information by using the extracted additional information; and a restoration step of restoring original digital image information from the digital image information having the additional information removed therefrom, by using information of overflowing position and an amount of overflow when embedding and correcting the overflow that occurred when embedding, wherein said extraction step comprises:

a first calculation step for calculating a characteristic value of the digital image information;

a second calculation step for calculating a characteristic value of at least two subsets, for each bit when the additional information is embedded in the digital image information; and a determination step for determining embedded bit information from a difference between the characteristic value calculated by said first calculation step and the characteristic value calculated by said second calculation step, wherein said extraction step extracts the additional information based on a result of determination by said determination step.

17. An information processing method according to claim 16, further comprising:

an assignment step of assigning a position where the additional information is embedded, in an image represented by the digital image information; and a determination step of determining reliability of a result of the assignment by comparing a region of interest indicated by the additional information extracted in said extraction step with the assigned position.

18. A storage medium storing computer-executable program codes for removing additional information embedded in digital image information from the digital image information and restoring original digital image information, said program codes comprising:

a program code of an extraction step of extracting the additional information embedded in digital image information from the digital image information;

a program code of a removing step of removing the additional information embedded in the digital image information from the digital image information by using the extracted additional information; and a program code of a restoration step of restoring original digital image information from the digital image information having the additional information removed therefrom, by using information of overflowing position and an amount of overflow when embedding and correcting the overflow that occurred when embedding, wherein said extraction step comprises:

program code of a first calculation step for calculating a characteristic value of the digital image information;

program code of a second calculation step for calculating a characteristic value of at least two subsets, for each bit when the additional information is embedded in the digital image information; and program code of a determination step for determining embedded bit information from a difference between the characteristic value calculated by said first calculation step and the characteristic value calculated by said second calculation step, wherein said extraction step extracts the additional information based on a result of determination by said determination step.

19. A storage medium according to claim 18, wherein said program codes further comprise:

program code of an assignment step of assigning a position where the additional information is embedded, in an image represented by the digital image information; and program code of a determination step of determining reliability of a result of the assignment by comparing a region of interest indicated by the additional information extracted in said extraction step with the assigned position.

* * * * *

UNITED STATES PATENT AND TRADEMARK OFFICE
CERTIFICATE OF CORRECTION

PATENT NO.       : 7,231,522 B2
APPLICATION NO.  : 09/969778
DATED            : June 12, 2007
INVENTOR(S)      : Tomochika Murakami et al.

It is certified that error appears in the above-identified patent and that said Letters Patent is hereby corrected as shown below:

COLUMN 10:
Line 33, "$a'_1 = a_i+c$" should read -- $a'_i=a_i+c$ --;

Line 55, In the formula: " $=\frac{1}{N}\sum_{i=1}^{N}(a'_1-b'_1)+2c$ " should read -- $=\frac{1}{N}\sum_{i=1}^{N}(a'_i-b'_i)+2c$ --; and Line 65, "$a'_1 = a_i\text{-}c$" should read -- $a'_i = a_i\text{-}c$ --.

COLUMN 11:
Line 10, In the formula: " $=\frac{1}{N}\sum_{i=1}^{N}(a'_i-b'_i)+2c$ " should read -- " $=\frac{1}{N}\sum_{i=1}^{N}(a'_i-b'_i)-2c$ " --.

COLUMN 16:
Line 47, "$b_1 \leq 255\text{-}c$" should read -- $b_i \leq 255\text{-}c$ --; and
Line 62, "$b_1 \leq 255\text{-}c$" should read -- $b_i \leq 255\text{-}c$ --.

Signed and Sealed this

Seventeenth Day of March, 2009

JOHN DOLL
*Acting Director of the United States Patent and Trademark Office*